(12) United States Patent
Oikawa et al.

(10) Patent No.: US 9,715,765 B2
(45) Date of Patent: Jul. 25, 2017

(54) HEAD MOUNTED DISPLAY AND DISPLAY FOR SELECTIVELY DISPLAYING A SYNTHESIZED IMAGE AND A PHYSICAL SPACE IMAGE, AND CONTROL METHOD THEREOF

(71) Applicant: CANON KABUSHIKI KAISHA, Tokyo (JP)

(72) Inventors: Makoto Oikawa, Tokyo (JP); Masahiro Suzuki, Kawasaki (JP); Tomohiko Shimoyama, Tokyo (JP); Akihiro Katayama, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 60 days.

(21) Appl. No.: 14/526,841

(22) Filed: Oct. 29, 2014

(65) Prior Publication Data

US 2015/0049115 A1 Feb. 19, 2015

Related U.S. Application Data

(62) Division of application No. 12/127,583, filed on May 27, 2008, now Pat. No. 9,070,215.

(30) Foreign Application Priority Data

May 29, 2007 (JP) .................... 2007-142324

(51) Int. Cl.
*G06T 19/00* (2011.01)
*G02B 27/01* (2006.01)
*G09G 5/00* (2006.01)
*G09G 5/36* (2006.01)
*G09G 5/393* (2006.01)

(52) U.S. Cl.
CPC ........ *G06T 19/006* (2013.01); *G02B 27/0101* (2013.01); *G02B 27/017* (2013.01); *G09G 5/006* (2013.01); *G02B 2027/014* (2013.01); *G02B 2027/0187* (2013.01); *G09G 5/363* (2013.01); *G09G 5/393* (2013.01); *G09G 2340/125* (2013.01); *G09G 2360/18* (2013.01); *G09G 2370/16* (2013.01); *G09G 2380/02* (2013.01)

(58) Field of Classification Search
CPC .................... G06T 19/006; G09G 2370/16
See application file for complete search history.

(56) References Cited

U.S. PATENT DOCUMENTS

| | | | | |
|---|---|---|---|---|
| 5,196,947 A * | 3/1993 | Takahashi | ............... | H04N 1/00 358/437 |
| 6,046,773 A * | 4/2000 | Martens | ............... | H04N 5/2628 348/E5.055 |
| 6,963,589 B1 * | 11/2005 | Sugata | ............... | H04L 1/0045 370/535 |
| 2008/0267523 A1 * | 10/2008 | Shimoyama | ....... | H04N 13/0003 382/254 |

* cited by examiner

*Primary Examiner* — Jeffery A Brier
(74) *Attorney, Agent, or Firm* — Cowan, Liebowitz & Latman, P.C.

(57) ABSTRACT

A display control unit causes a display device to display the synthesized image in a case where the determination unit does not determine that the error region exists in the synthesized image, and causes the display device to display the physical space image in a case where the determination unit does determine that the error region exists in the synthesized image.

21 Claims, 14 Drawing Sheets

HEAD MOUNTED DISPLAY AND DISPLAY FOR SELECTIVELY DISPLAYING A SYNTHESIZED IMAGE AND A PHYSICAL SPACE IMAGE, AND CONTROL METHOD THEREOF

CROSS-REFERENCE TO RELATED APPLICATIONS

This application is a divisional of application Ser. No. 12/127,583, filed May 27, 2008, the entire disclosure of which is hereby incorporated by reference.

BACKGROUND OF THE INVENTION

1. Field of the Invention

The present invention relates to a technique of displaying an image.

2. Description of the Related Art

Mixed reality, that is, so-called MR is recently known as a technology of merging a real world and a virtual world seamlessly in real time. In one MR technology, a video see-through HMD (Head Mounted Display) is used and an object almost matching an object observed from the pupil position of an HMD wearer is sensed by, for example, a video camera. A CG (Computer Graphics) image is superimposed on the sensed image to generate an image. The generated image is presented in front of the eyes of the HMD wearer.

FIG. 12 is a block diagram showing the functional arrangement of a general video see-through mixed reality system (to be referred to as a system hereinafter). A general system will be described below with reference to FIG. 12.

As shown in FIG. 12, the system comprises an image processing apparatus 1202 and a video see-through HMD 1201.

The video see-through HMD 1201 includes an image sensing unit 1203, a display unit 1204, a three-dimensional (3D) position sensor 1205, and a I/F (interface) 1206. The image processing apparatus 1202 is generally an apparatus such as a personal computer or workstation with an advanced calculation processing function and graphic display function, and includes an I/F 1207, position and orientation information generation unit 1208, and CG rendering composition unit 1210.

The components forming the video see-through HMD 1201 will be described first.

The image sensing unit 1203 senses an image (physical space image) of the outside world which can be seen, in almost the same direction as a direction of line of sight, from a position almost matching the viewpoint of the wearer who is wearing the video see-through HMD 1201 on the head. The image sensing unit 1203 is generally provided for each of the right and left eyes to generate a stereoscopic image, and includes an image sensing element, an optical system, and a DSP (Digital Signal Processor) that executes an image process.

The display unit 1204 displays an MR image output from the image processing apparatus 1202. The display unit 1204 is also provided for each of the right and left eyes, and includes a display device and optical system. A small liquid crystal display device or a retina scan type device by MEMS (Micro Electro Mechanical System) is used as the display device.

The 3D position sensor 1205 measures the position and orientation of itself. A magnetic sensor or a gyro sensor (acceleration and angular velocity) is used as the 3D position sensor 1205.

The I/F 1206 interconnects the video see-through HMD 1201 and the image processing apparatus 1202. The image sensed by the image sensing unit 1203 and a measurement result by the 3D position sensor 1205 are transferred to the image processing apparatus 1202 via the I/F 1206. The MR image generated on the image processing apparatus 1202 side is input to the video see-through HMD 1201 via the I/F 1206. The I/F 1206 that is required to transmit an enormous quantity of data in real time uses a connector compatible with a metal line such as a USB or IEEE1394 or an optical fiber such as GigabitEthernet®.

The components of the image processing apparatus 1202 will be described next.

The I/F 1207 interconnects the image processing apparatus 1202 and the video see-through HMD 1201. The image sensed by the image sensing unit 1203 and the measurement result by the 3D position sensor 1205 are transferred to the image processing apparatus 1202 via the I/F 1207. The MR image generated on the image processing apparatus 1202 side is input to the video see-through HMD 1201 via the I/F 1207.

The position and orientation information generation unit 1208 calculates position and orientation information representing the position and orientation of the viewpoint of the video see-through HMD 1201 wearer based on the measurement result by the 3D position sensor 1205 which has been received from the video see-through HMD 1201. Alternatively, a method of generating the position and orientation information of the viewpoint by using a marker or the like within the image sensed by the image sensing unit 1203 may also be used, as a matter of course.

Contents 1209 form a storage device which stores data pertaining to virtual objects forming the virtual space.

The CG rendering composition unit 1210 generates an image (CG image), of the virtual space according to the data of the contents 1209, which is seen from the viewpoint having the position and orientation represented by the position and orientation information generated by the position and orientation information generation unit 1208. The CG rendering composition unit 1210 composites the CG image on the image received from the video see-through HMD 1201 via the I/F 1207, and generates an MR image. The CG rendering composition unit 1210 outputs the generated MR image to the video see-through HMD 1201 via the I/F 1207.

With the above-described arrangement, the video see-through HMD 1201 wearer can experience a mixed reality world obtained by merging a real world and a virtual world seamlessly in real time.

In the above-mentioned system using the video see-through HMD, it is important to secure sight of the wearer, even if a communication error occurs between the HMD and the image processing apparatus. In particular, when a wireless scheme is employed for image transmission, errors may occur frequently depending on the environment of use and the distance between the apparatuses. In one technique, when such communication error occurs, a frame of a predetermined time before a carrier wave disappears in infrared ray video transmission is displayed as a still image together with a warning message (patent reference 1).

The following technique has also been proposed. That is, upon occurrence of a decoding error in one channel, a stereoscopic video display system including a plurality of cameras controls to transfer some or all of image data stored in another channel to the channel in which the error has occurred. The system interpolates some or all of image data in which the error has occurred, and displays the interpolated image (patent reference 2).

[Patent Reference 1] Japanese Patent Laid-Open No. 5-76078
[Patent Reference 2] Japanese Patent Laid-Open No. 7-322302

However, the above-described prior art has the following problems.

Assume that an error occurs in wireless image transmission and it is difficult to transmit the image. If an image of the successfully received, immediately preceding frame is displayed, a wearer does not know the actual outside world when moving. That is, it is difficult to secure the user's sight.

Furthermore, when an interpolation process is executed as in another conventional example, as the amount and frequency of error increase, it becomes difficult to reconstruct an image even if an identical image, stereoscopic image, or a preceding frame is used. Therefore, it is also difficult to secure the wearer's sight.

SUMMARY OF THE INVENTION

The present invention has been made in consideration of the above problems, and has as its object to provide a technique for, even if an error portion appears within an image of a certain frame, providing a suitable image by correcting the error portion in a simpler and easier way, when the image is presented to both eyes of an observer.

According to the first aspect of the present invention, there is provided a head mounted display having a display unit for displaying an image in front of eyes of an observer, comprising: an input unit adapted to sequentially input images of frames; a determination unit adapted to determine whether an error portion exists within an image of a frame of interest input by the input unit; and a display control unit adapted to cause the display unit to display the image of the frame of interest when the determination unit determines that no error portion exists within the image of the frame of interest,
when the determination unit determines that the error portion exists within the image of the frame of interest, the display control unit including a unit adapted to determine whether a correction process for the image of the frame of interest is to be executed, on the basis of the size of the error portion within the image of the frame of interest, which has been calculated during the determination process by the determination unit, and a determination result determined by the determination unit for a frame before the frame of interest, and a control unit adapted to select, based on the size and the determination result, either display control to cause the display unit to display the image of the frame before the frame of interest as the image of the frame of interest or display control to cause the display unit to display a result obtained by correcting the error portion within the image of the frame of interest using a pixel group surrounding the error portion, when it is determined that the correction process for the image of the frame of interest is to be executed, and to execute the selected display control.

According to the second aspect of the present invention, there is provided a head mounted display for displaying an image in front of eyes of an observer, comprising: a presentation unit for presenting an image to one eye of the observer; and a presentation unit for presenting an image to the other eye, each of the presentation units including an input unit adapted to sequentially input images of frames, a determination unit adapted to determine whether an error portion exists within an image of a frame of interest input by the input unit, and a display control unit adapted to cause a display unit to display the image of the frame of interest when the determination unit determines that no error portion exists within the image of the frame of interest, and when the determination unit determines that the error portion exists within the image of the frame of interest, the display control unit including a unit adapted to determine whether a correction process for the image of the frame of interest is to be executed, on the basis of the size of the error portion within the image of the frame of interest, which has been calculated during the determination process by the determination unit, and a determination result determined by the determination unit for a frame before the frame of interest, and a control unit adapted to select, based on the size and the determination result, either display control to cause the display unit to display, as the image of the frame of interest, the image of the frame of interest input by the input unit of the other presentation unit or display control to cause the display unit to display a result obtained by correcting the error portion within the image of the frame of interest using a pixel group surrounding the error portion, when it is determined that the correction process for the image of the frame of interest is to be executed, and to execute the selected display control.

According to the third aspect of the present invention, there is provided a head mounted display for displaying an image in front of eyes of an observer, comprising: a unit adapted Lo acquire a physical space image obtained by sensing a physical space by an image sensing device; a unit adapted to acquire a position and orientation of the image sensing device; a unit adapted to acquire a virtual space image generated based on the position and orientation; a unit adapted to detect the presence/absence of an error for the virtual space image; and a display control unit adapted to display a composite image of the physical space image and the virtual space image when the error is not detected, and to display the physical space image when the error is detected.

According to the fourth aspect of the present invention, there is provided a head mounted display for displaying an image in front of eyes of an observer, comprising: a unit adapted to acquire a physical space image obtained by sensing a physical space by an image sensing device; a unit adapted to acquire a position and orientation of the image sensing device; a unit adapted to acquire a composite image of the physical space image and a virtual space image generated based on the position and orientation; a unit adapted to detect the presence/absence of an error for the composite image; and a display control unit adapted to display the composite image when the error is not detected, and to display the physical space image when the error is detected.

According to the fifth aspect of the present invention, there is provided a control method for a head mounted display having a display unit which displays an image in front of eyes of an observer, comprising: an input step of sequentially inputting images of frames; a determination step of determining whether an error portion exists within an image of a frame of interest input in the input step; and a display control step of causing the display unit to display the image of the frame of interest when it is determined in the determination step that no error portion exists within the image of the frame of interest, when it is determined in the determination step that the error portion exists within the image of the frame of interest, the display control step including, a step of determining whether a correction process for the image of the frame of interest is to be executed, on the basis of the size of the error portion within the image of the frame of interest, which has been calculated during the determination process in the determination step, and a determination result determined for a frame before the frame of interest in the determination step, and a control step of selecting, based on the size and the determination result, either display control to cause the display unit to display the image of the frame before the frame of interest as the image of the frame of interest or display control to cause the display unit to display a result obtained by correcting the error portion within the image of the frame of interest using a pixel group surrounding the error portion, when it is determined that the correction process for the image of the frame of interest is to be executed, and of executing the selected display control.

According to the sixth aspect of the present invention, there is provided a control method for a head mounted display which displays an image in front of eyes of an observer, wherein the head mounted display includes a presentation unit for presenting an image to one eye of the observer and that for presenting an image to the other eye, each of the presentation units executing an input step of sequentially input images of frames, a determination step of determining whether an error portion exists within an image of a frame of interest input in the input step, and a display control step of causing a display unit to display the image of the frame of interest when it is determined in the determination step that no error portion exists within the image of the frame of interest, and when it is determined in the determination step that the error portion exists within the image of the frame of interest, the display control step including a step of determining whether a correction process for the image of the frame of interest is to be executed, on the basis of the size of the error portion within the image of the frame of interest, which has been calculated during the determination process in the determination step, and a determination result determined for a frame before the frame of interest in the determination step, and a control step of selecting, based on the size and the determination result, either display control to cause the display unit to display, as the image of the frame of interest, the image of the frame of interest input in the input step of the other presentation unit or display control to cause the display unit to display a result obtained by correcting the error portion within the image of the frame of interest using a pixel group surrounding the error portion, when it is determined that the correction process for the image of the frame of interest is to be executed, and of executing the selected display control.

According to the seventh aspect of the present invention, there is provided a control method for a head mounted display which displays an image in front of eyes of an observer, comprising: a step of acquiring a physical space image obtained by sensing a physical space by an image sensing device; a step of acquiring a position and orientation of the image sensing device; a step of acquiring a virtual space image generated based on the position and orientation; a step of detecting the presence/absence of an error for the virtual space image; and a display control step of displaying a composite image of the physical space image and the virtual space image when the error is not detected, and displaying the physical space image when the error is detected.

According to the eighth aspect of the present invention, there is provided a control method for a head mounted display which displays an image in front of eyes of an observer, comprising: a step of acquiring a physical space image obtained by sensing a physical space by an image sensing device; a step of acquiring a position and orientation of the image sensing device; a step of acquiring a composite image of the physical space image and a virtual space image generated based on the position and orientation; a step of detecting the presence/absence of an error for the composite image; and a display control step of displaying the composite image when the error is not detected, and displaying the physical space image when the error is detected.

According to the ninth aspect of the present invention, there is provided a display having a display unit for displaying an image in front of eyes of an observer, comprising: an input unit adapted to sequentially input images of frames; a determination unit adapted to determine whether an error portion exists within an image of a frame of interest input by the input unit; and a display control unit adapted to cause the display unit to display the image of the frame of interest when the determination unit determines that no error portion exists within the image of the frame of interest, when the determination unit determines that the error portion exists within the image of the frame of interest, the display control unit including a unit adapted to determine whether a correction process for the image of the frame of interest is to be executed, on the basis of the size of the error portion within the image of the frame of interest, which has been calculated during the determination process by the determination unit, and a determination result determined by the determination unit for a frame before the frame of interest, and a control unit adapted to select, based on the size and the determination result, either display control to cause the display unit to display the image of the frame before the frame of interest as the image of the frame of interest or display control to cause the display unit to display a result obtained by correcting the error portion within the image of the frame of interest using a pixel group surrounding the error portion, when it is determined that the correction process for the image of the frame of interest is to be executed, and to execute the selected display control.

According to the tenth aspect of the present invention, there is provided a display for displaying an image in front of eyes of an observer, comprising: a presentation unit for presenting an image to one eye of the observer; and a presentation unit for presenting an image to the other eye, each of the presentation units including an input unit adapted to sequentially input images of frames, a determination unit adapted to determine whether an error portion exists within an image of a frame of interest input by the input unit, and a display control unit adapted to cause a display unit to display the image of the frame of interest when the determination unit determines that no error portion exists within the image of the frame of interest, and when the determination unit determines that the error portion exists within the image of the frame of interest, the display control unit including a unit adapted to determine whether a correction process for the image of the frame of interest is to be executed, on the basis of the size of the error portion within the image of the frame of interest, which has been calculated during the determination process by the determination unit, and a determination result determined by the determination unit for a frame before the frame of interest, and a control unit adapted to select, based on the size and the determination result, either display control to cause the display unit to display, as the image of the frame of interest, the image of the frame of interest input by the input unit of the other presentation unit or display control to cause the display unit to display a result obtained by correcting the error portion within the image of the frame of interest using a pixel group surrounding the error portion, when it is determined that the correction process for the image of the frame of interest is to be executed, and to execute the selected display control.

According to the eleventh aspect of the present invention, there is provided a display for displaying an image in front of eyes of an observer, comprising: a unit adapted to acquire a physical space image obtained by sensing a physical space by an image sensing device; a unit adapted to acquire a position and orientation of the image sensing device; a unit adapted to acquire a virtual space image generated based on the position and orientation; a unit adapted to detect the presence/absence of an error for the virtual space image; and a display control unit adapted to display a composite image of the physical space image and the virtual space image when the error is not detected, and to display the physical space image when the error is detected.

According to the twelfth aspect of the present invention, there is provided a display for displaying an image in front of eyes of an observer, comprising: a unit adapted to acquire a physical space image obtained by sensing a physical space by an image sensing device; a unit adapted to acquire a position and orientation of the image sensing device; a unit adapted to acquire a composite image of the physical space image and a virtual space image generated based on the position and orientation; a unit adapted to detect the presence/absence of an error for the composite image; and a display control unit adapted to display the composite image when the error is not detected, and to display the physical space image when the error is detected.

According to the thirteenth aspect of the present invention, there is provided a control method for a display having a display unit which displays an image in front of eyes of an observer, comprising: an input step of sequentially inputting images of frames; a determination step of determining whether an error portion exists within an image of a frame of interest input in the input step; and a display control step of causing the display unit to display the image of the frame of interest when it is determined in the determination step that no error portion exists within the image of the frame of interest, when it is determined in the determination step that the error portion exists within the image of the frame of interest, the display control step including a step of determining whether a correction process for the image of the frame of interest is to be executed, on the basis of the size of the error portion within the image of the frame of interest, which has been calculated during the determination process in the determination step, and a determination result determined for a frame before the frame of interest in the determination step, and a control step of selecting, based on the size and the determination result, either display control to cause the display unit to display the image of the frame before the frame of interest as the image of the frame of interest or display control to cause the display unit to display a result obtained by correcting the error portion within the image of the frame of interest using a pixel group surrounding the error portion, when it is determined that the correction process for the image of the frame of interest is to be executed, and of executing the selected display control.

According to the fourteenth aspect of the present invention, there is provided a control method for a display which displays an image in front of eyes of an observer, wherein the display includes a presentation unit for presenting an image to one eye of the observer and that for presenting an image to the other eye, each of the presentation units executing an input step of sequentially input images of frames, a determination step of determining whether an error portion exists within an image of a frame of interest input in the input step, and a display control step of causing a display unit to display the image of the frame of interest when it is determined in the determination step that no error portion exists within the image of the frame of interest, and when it is determined in the determination step that the error portion exists within the image of the frame of interest, the display control step including a step of determining whether a correction process for the image of the frame of interest is to be executed, on the basis of the size of the error portion within the image of the frame of interest, which has been calculated during the determination process in the determination step, and a determination result determined for a frame before the frame of interest in the determination step, and a control step of selecting, based on the size and the determination result, either display control to cause the display unit to display, as the image of the frame of interest, the image of the frame of interest input in the input step of the other presentation unit or display control to cause the display unit to display a result obtained by correcting the error portion within the image of the frame of interest using a pixel group surrounding the error portion, when it is determined that the correction process for the image of the frame of interest is to be executed, and of executing the selected display control.

According to the fifteenth aspect of the present invention, there is provided a control method for a display which displays an image in front of eyes of an observer, comprising: a step of acquiring a physical space image obtained by sensing a physical space by an image sensing device; a step of acquiring a position and orientation of the image sensing device; a step of acquiring a virtual space image generated based on the position and orientation; a step of detecting the presence/absence of an error for the virtual space image; and a display control step of displaying a composite image of the physical space image and the virtual space image when the error is not detected, and displaying the physical space image when the error is detected.

According to the sixteenth aspect of the present invention, there is provided a control method for a display which displays an image in front of eyes of an observer, comprising: a step of acquiring a physical space image obtained by sensing a physical space by an image sensing device; a step of acquiring a position and orientation of the image sensing device; a step of acquiring a composite image of the physical space image and a virtual space image generated based on the position and orientation; a step of detecting the presence/absence of an error for the composite image; and a display control step of displaying the composite image when the error is not detected, and displaying the physical space image when the error is detected.

Further features of the present invention will become apparent from the following description of exemplary embodiments with reference to the attached drawings.

DESCRIPTION OF THE EMBODIMENTS

Preferred embodiments of the present invention will be described in detail hereinafter with reference to the accompanying drawings. Note that these embodiments will be described as examples of preferred arrangements of the invention described in the scope of claims, and such invention is not limited to the embodiments to be described hereinafter.

[First Embodiment]

Figure 1:
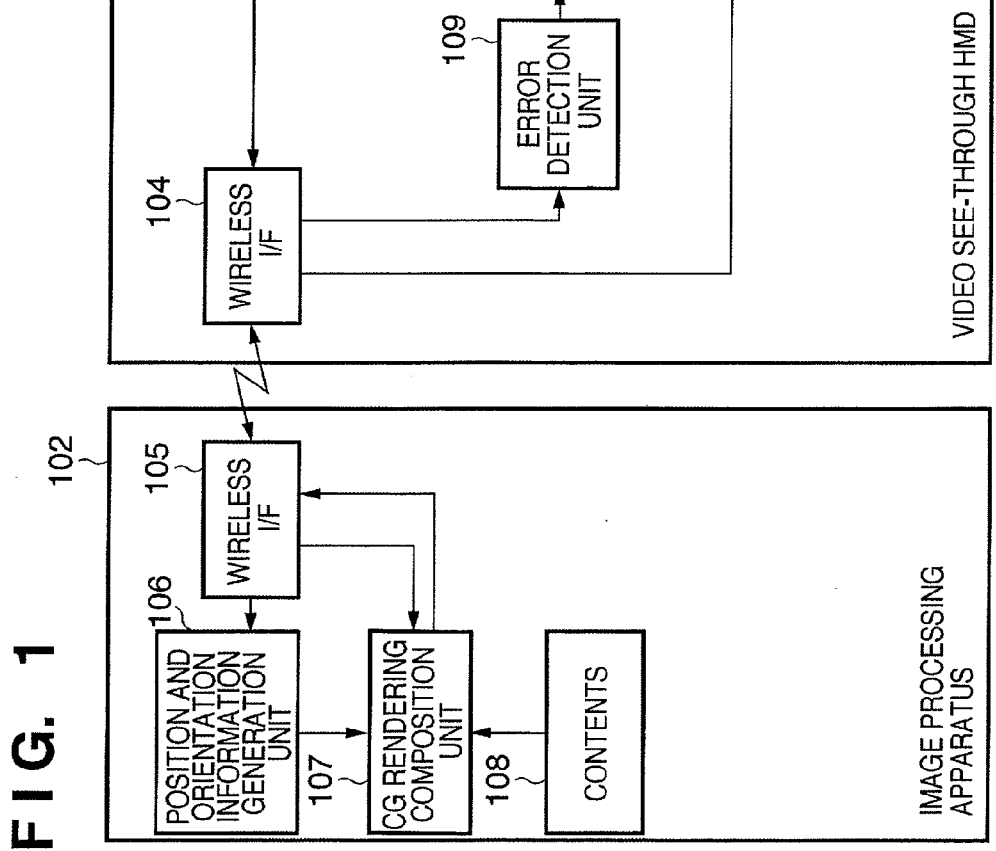
FIG. 1 is a block diagram showing the functional arrangement of a system according to the first embodiment of the present invention.

FIG. 1 is a block diagram showing the functional arrangement of a system according to this embodiment. As shown in FIG. 1, the system according to this embodiment comprises an image processing apparatus 102 represented by a computer such as a PC (Personal Computer), and a video see-through HMD 101 as an example of a head mounted display. The image processing apparatus 102 and the video see-through HMD 101 wirelessly communicate with each other.

The video see-through HMD 101 will be described first.

An image sensing unit 103 is attached at a position near an eye (either the left or right eye) of an observer wearing the video see-through HMD 101 on the head so as to face in a direction of line of sight of the observer. The image sensing unit 103 is a video camera (image sensing device) which senses a movie. Images (physical space images) of the sensed frames are sequentially output to a subsequent OSD (On Screen Display) generation unit 114 and wireless I/F 104. The wireless I/F 104 sequentially wirelessly transmits the images of the frames received from the image sensing unit 103 to the image processing apparatus 102.

Details of processing will be described later. In brief, the image processing apparatus 102 transmits to the wireless I/F 104 an MR image (composite image) formed by superimposing a virtual space image on a physical space image. The wireless I/F 104 receives (inputs) the transmitted MR image, and outputs it to a subsequent error detection unit 109 and interpolation unit 112.

Each time the composite image is received from the wireless I/F 104, the interpolation unit 112 stores the received composite image in a frame buffer 113.

The error detection unit 109 checks (determines) whether an error portion (error region) exists within the composite image received from the wireless I/F 104. In this check process, a general error check such as a parity check, checksum, or CRC (Cyclic Redundancy Check) is used. The error detection unit 109 outputs the check result to a subsequent error region/frequency determination unit 110.

The error region/frequency determination unit 110 refers to the determination result by the error detection unit 109. If the error detection unit 109 detects no error portion, the error region/frequency determination unit 110 informs a selector 111 of it. If the error detection unit 109 detects an error portion, by using "the size of the error portion" acquired during the determination process and "a result determined by the error detection unit 109 for an image of a past frame", the error region/frequency determination unit 110 executes a determination process to be described later. This determination process is executed as follows. That is, it is determined whether the error portion within a composite image of the current frame is to be corrected (interpolated) by substituting a composite image of the immediately preceding frame for that of the current image or by using a pixel group surrounding the error portion, or whether it is impossible to correct the error portion. The error region/frequency determination unit 110 informs the subsequent selector 111 of the determination result.

If the error region/frequency determination unit 110 informs the selector 111 that the error detection unit 109 detects no error portion, the selector 111 instructs the interpolation unit 112 to read out the composite image of the current frame stored in the frame buffer 113. The interpolation unit 112 reads out the composite image in accordance with the instruction, and outputs the readout image to the selector 111. The selector 111 outputs the composite image to a display unit 115.

When the error region/frequency determination unit 110 informs the selector 111 that the composite image of the immediately preceding frame is to be substituted for the composite image of the current frame in order to correct the error portion, the selector 111 operates as follows. The selector 111 instructs the interpolation unit 112 to read out the composite image of the frame immediately before the current frame stored in the frame buffer 113. The interpolation unit 112 reads out the composite image in accordance with the instruction, and outputs the readout image to the selector 111. The selector 111 outputs the composite image to the display unit 115.

When the error region/frequency determination unit 110 informs the selector 111 that the error portion is to be corrected by using the pixel group surrounding the error portion, the selector 111 operates as follows. The selector 111 instructs the interpolation unit 112 to read out the composite image of the current frame stored in the frame buffer 113. The interpolation unit 112 reads out the composite image in accordance with the instruction, and corrects the error portion within the composite image in a process to be described later. The interpolation unit 112 outputs the corrected composite image to the selector 111. The selector 111 outputs the composite image to the display unit 115.

When the error region/frequency determination unit 110 informs the selector 111 that it is impossible to correct the error portion, the selector 111 operates as follows. That is, the selector 111 instructs the OSD generation unit 114 to superimpose message information representing a warning on the physical space image which has been acquired by the OSD generation unit 114 from the image sensing unit 103 as the physical space image of the current frame. The message information is, for example, text data representing that the virtual space image cannot be composited. The message information is not limited to this, and may take various forms, as a matter of course. The selector 111 outputs to the display unit 115 the physical space image on which the message information is superimposed.

Upon reception of the image from the selector 111, the display unit 115 displays it. The display unit 115 is attached to the video see-through HMD 101 so as to be located in front of the eyes of the observer wearing the video see-through HMD 101 on the head. The image output from the selector 111 is therefore displayed in front of the observer's eyes wearing the video see-through HMD 101 on the head.

The image processing apparatus 102 will be described next.

Upon reception of the images of the frames transmitted from the wireless I/F 104, a wireless I/F 105 sequentially outputs them to a subsequent position and orientation information generation unit 106.

The position and orientation information generation unit 106 uses the image received from the wireless I/F 105 to calculate the position and orientation information of the video see-through HMD 101. A process for calculating the position and orientation information by using the image will be described later. The calculated position and orientation information is output to a subsequent CG rendering composition unit 107.

Contents 108 form a storage device which stores a data group pertaining to virtual objects forming the virtual space. For example, the data group includes initial position and orientation data of virtual objects. When each virtual object is formed by polygons, the data group includes data of normal vectors and colors of the polygons, and coordinate value data of vertices which form each polygon.

The CG rendering composition unit 107 generates, as a virtual space image, an image, of the virtual space according to the data of the contents 108, which is seen from the viewpoint having the position and orientation represented by the position and orientation information received from the position and orientation information generation unit 106. The CG rendering composition unit 107 superimposes the generated virtual space image on the physical space image received from the wireless I/F 105, and generates a composite image as the MR image. The CG rendering composition unit 107 outputs the generated MR image to the wireless I/F 105. The wireless I/F 105 wirelessly transmits the MR image to the video see-through HMD 101.

Figure 2:
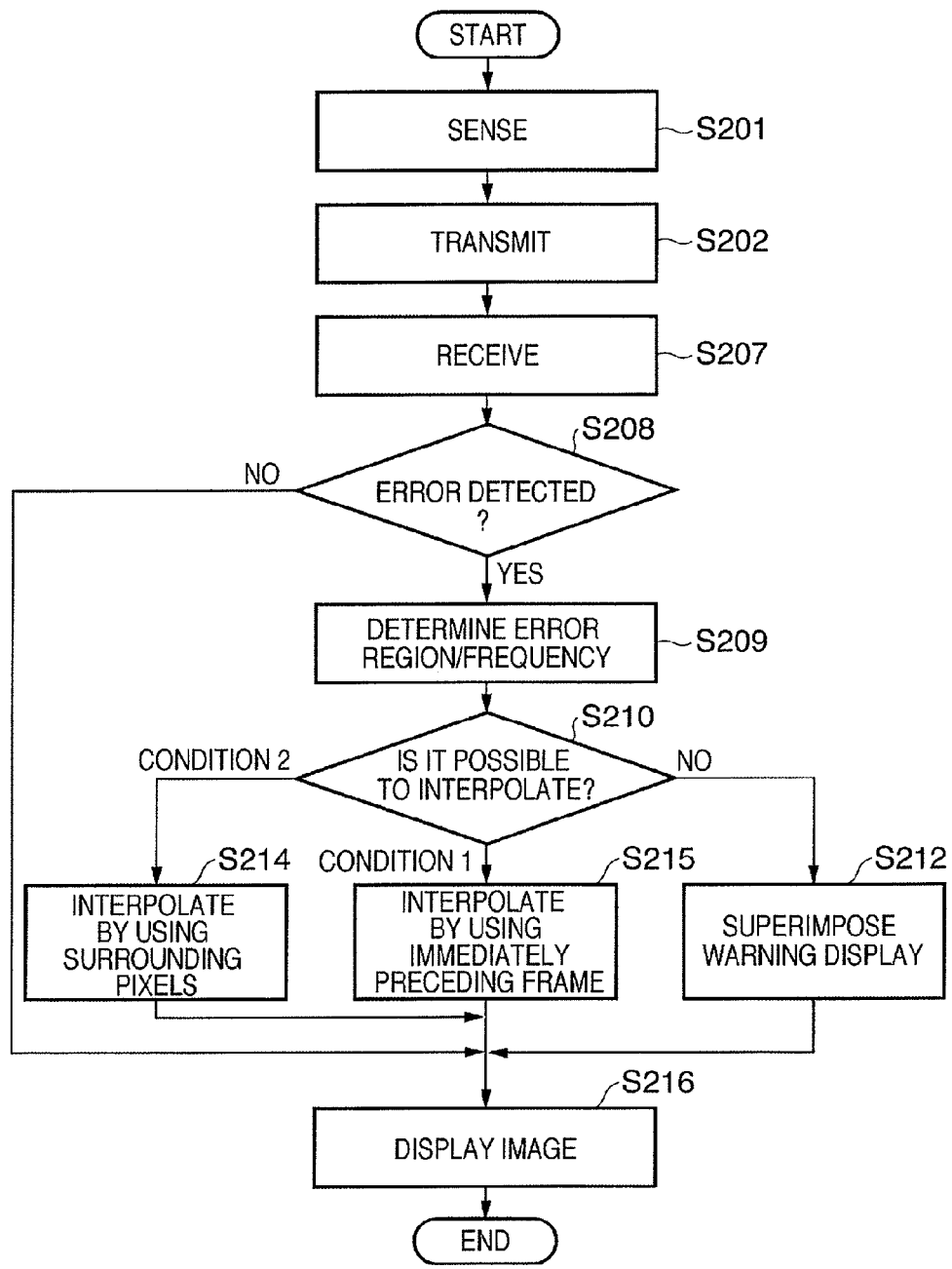
FIG. 2 is a flowchart of a process executed by a video see-through HMD 101.

FIG. 2 is a flowchart of a process executed by the video see-through HMD 101. The process according to the flowchart shown in FIG. 2 is that of causing the display unit 115 to display an MR image of a frame, and in practice the process is repeated. This enables the display unit 115 to display MR images of a plurality of frames. Note that a process of causing the display unit 115 to display an MR image of the frame of interest (each of the second and subsequent frames) will be described below for descriptive convenience.

In step S201, the image sensing unit 103 acquires an image of the frame of interest by sensing a physical space seen from the position of the image sensing unit 103 in a sensing direction. The image sensing unit 103 outputs the acquired image to the wireless I/F 104 and OSD generation unit 114.

In step S202, the wireless I/F 104 wirelessly transmits to the image processing apparatus 102 the image of the frame of interest which has been acquired in step S201.

The image processing apparatus 102 executes the above-described process using the image transmitted in step S202, generates an MR image of the frame of interest, and wirelessly transmits it to the video see-through HMD 101 via the wireless I/F 105.

In step S207, the wireless I/F 104 receives the MR image of the frame of interest which has been transmitted from the image processing apparatus 102. The wireless I/F 104 then outputs the received MR image to the error detection unit 109 and interpolation unit 112. The interpolation unit 112 stores the MR image of the frame of interest in the frame buffer 113.

In step S208, the error detection unit 109 determines whether an error portion exists within the MR image of the frame of interest. The error detection unit 109 informs the error region/frequency determination unit 110 of the determination result. If the determination result represents that an error portion exists, the process advances to step S209; otherwise, the process advances to step S216.

If the process advances from step S208 to step S216, the error region/frequency determination unit 110 informs the selector 111 in step S216 that the error detection unit 109 detects no error portion. The selector 111 instructs the interpolation unit 112 to read out the MR image of the frame of interest stored in the frame buffer 113. The interpolation unit 112 reads out the MR image of the frame of interest in accordance with the instruction, and outputs the readout MR image to the selector 111. The selector 111 then outputs the MR image to the display unit 115.

On the other hand, in step S209, the error region/frequency determination unit 110 determines whether to correct (it is possible to correct) the error portion detected in step S208.

Details of the determination process will be described here. The error region/frequency determination unit 110 refers to "the size of the error portion" acquired during the process of detecting the error portion by the error detection unit 109 and "a result determined by the error detection unit 109 for an image of a past frame". The error region/frequency determination unit 110 then determines whether "the size of the error portion" is equal to or larger than a predetermined threshold. The error region/frequency determination unit 110 also determines whether the error detection unit 109 determines that "the error portion exists" in the MR image of a past frame (the immediately preceding frame in this embodiment) before the frame of interest. The determination result for the past frame by the error detection unit 109 is held by the error detection unit 109 itself.

If the determination result represents that "the size of the error portion" is equal to or larger than the predetermined threshold and the error detection unit 109 determines that "the error portion exists" in the MR image of the frame immediately before the frame of interest, the error region/frequency determination unit 110 determines that "it is impossible to correct the error portion".

If "the size of the error portion" is equal to or larger than the predetermined threshold and the error detection unit 109 determines that "no error portion exists" in the MR image of the frame immediately before the frame of interest (condition 1), the error region/frequency determination unit 110 determines that the MR image of the immediately preceding frame is substituted for that of the frame of interest.

If "the size of the error portion" is smaller than the predetermined threshold and the error detection unit 109 determines that "the error portion exists" in the MR image of the frame immediately before the frame of interest (condition 2), the error region/frequency determination unit 110 determines that the error portion is corrected by using the pixel group surrounding the error portion.

As described above, when an error portion exists within the MR image of the frame of interest, it can be determined whether it is possible to correct the error portion. If it is possible to correct the error portion, how to correct it can be determined. Note that if "the size of the error portion" is smaller than the predetermined threshold and the error detection unit 109 determines that "no error portion exists" in the MR image of the frame immediately before the frame of interest, any method may be used to correct the error portion.

The above-described determination result by the error region/frequency determination unit 110 is output to the subsequent selector 111.

If the error region/frequency determination unit 110 informs the selector 111 that "it is impossible to correct the error portion", the process advances to step S212 via step S210.

In step S212, the selector 111 instructs the OSD generation unit 114 to superimpose message information representing a warning on the physical space image which has been acquired by the OSD generation unit 114 from the image sensing unit 103 as the physical space image of the frame of interest. The selector 111 outputs to the display unit 115 the physical space image on which the message information is superimposed. In step S216, the display unit 115 displays the physical space image on which the message information is superimposed.

If the above (condition 1) is satisfied, the process advances to step S215 via step S210.

In step 215, the selector 111 instructs the interpolation unit 112 to read out the MR image of the frame immediately before the frame of interest stored in the frame buffer 113. The interpolation unit 112 reads out the MR image in accordance with the instruction, and outputs the readout MR image to the selector 111. The selector 111 outputs the MR image to the display unit 115. In step S216, the display unit 115 displays, as the MR image of the frame of interest, the MR image of the frame immediately before the frame of interest.

If the above (condition 2) is satisfied, the process advances to step S214 via step S210.

In step S214, the selector 111 instructs the interpolation unit 112 to read out the MR image of the frame of interest stored in the frame buffer 113. The interpolation unit 112 reads out the MR image in accordance with the instruction, and corrects the error portion within the readout MR image by a process to be described later (a correction process). The interpolation unit 112 outputs the corrected MR image to the selector 111. The selector 111 outputs the corrected MR image to the display unit 115. In step S216, the display unit 115 displays, as the MR image of the frame of interest, the MR image within which the error portion has been corrected by using the pixel group surrounding the error portion.

Figure 3:
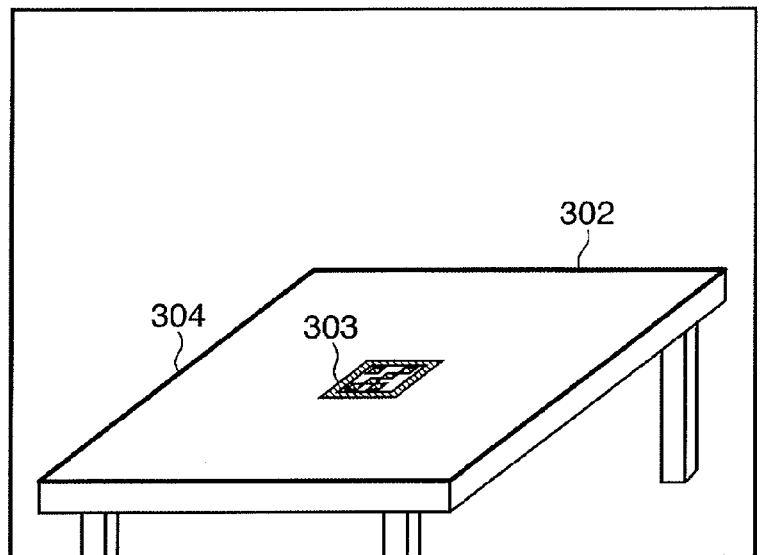
FIG. 3 is a view showing an example of a physical space sensed by an image sensing unit 103.

A process in which the position and orientation information generation unit 106 generates position and orientation information of the image sensing unit 103 from a physical space image will be described next. FIG. 3 is a view showing an example of a physical space sensed by the image sensing unit 103. Referring to FIG. 3, reference numeral 303 denotes a marker which includes two-dimensional barcodes obtained by coding various information and a frame surrounding the barcodes. The marker 303 is located on a table 302 as a physical object in FIG. 3. Reference numeral 301 denotes a physical space image acquired by sensing such physical space by the image sensing unit 103.

The image sensing unit 103 senses the physical space image 301, and outputs the sensed physical space image 301 to the position and orientation information generation unit 106 via the wireless I/Fs 104 and 105. The position and orientation information generation unit 106 detects the marker 303 within the physical space image 301. The position and orientation information generation unit 106 then analyzes the two-dimensional barcodes included in the detected marker 303, and recognizes the identification information of the two-dimensional barcodes. On the image processing apparatus 102 side, the three-dimensional coordinate position of the marker corresponding to the identification information is stored in advance. When the identification information is recognized with the process, the corresponding three-dimensional coordinate position can be specified. When the coordinate position of the marker 303 on the physical space image 301 and the three-dimensional coordinate position are used, it is possible to generate the position and orientation information of the image sensing unit 103 by using a technique known in the field of, for example, the photogrammetry. Note that a plurality of markers 303 may be used. An edge 304 within the image may be used in place of the marker 303. Furthermore, the marker 303 is not limited to that including the two-dimensional barcodes and a color marker or a non-directional marker such as a light-emitting element including an LED may be used. As described above, various objects and a combination thereof may be used in place of the marker 303. The above-described process executed by the position and orientation information generation unit 106 is a known technique, and no more explanation will be given.

Figure 4:
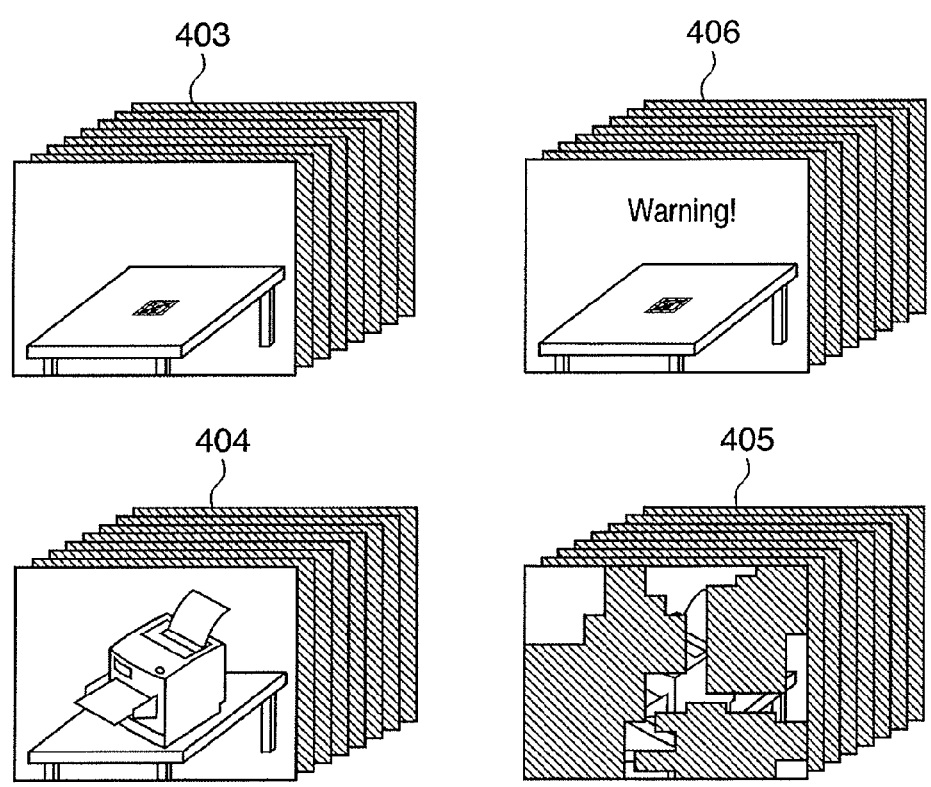
FIG. 4 is a view showing an example of an image transmitted/received between the video see-through HMD 101 and an image processing apparatus 102.

FIG. 4 is a view showing an example of an image transmitted/received between the video see-through HMD 101 and the image processing apparatus 102.

Referring to FIG. 4, reference numeral 403 denotes a physical space image sensed by the image sensing unit 103. This physical space image is transmitted to the image processing apparatus 102 side. The image processing apparatus 102 superimposes a virtual space image on the physical space image to generate an MR image 404, and transmits it to the video see-through HMD 101. In this transmission, assume that an error portion appears within the transmitted MR image, and that an error MR image 405 is received on the video see-through HMD 101 side. As shown in the error MR image 405, the size of the error portion (the hatched region) within the error MR image 405 is large. It is difficult to correct the error portion using a pixel group surrounding it. Assume also that an error portion exists within an image of a frame immediately before the error MR image 405. In this case, the video see-through HMD 101 superimposes message information representing a warning on the physical space image 403 to generate an image 406 and displays it.

Figure 5:
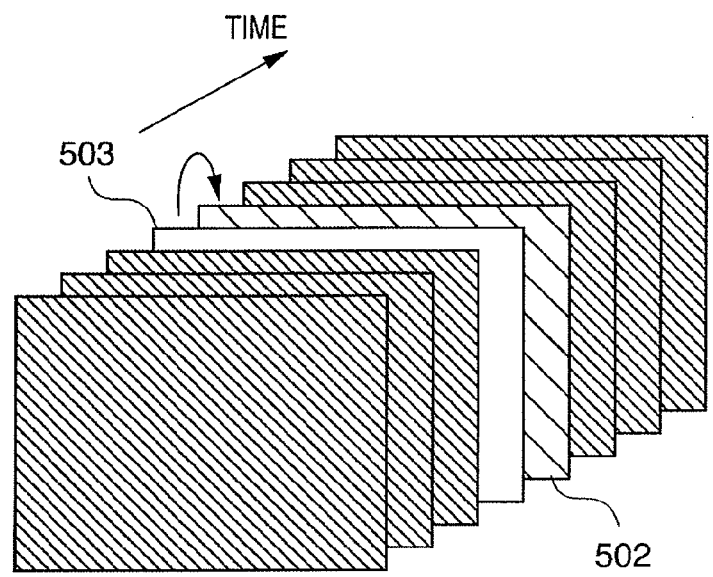
FIG. 5 is a view for explaining a process of substituting an MR image of an immediately preceding frame for that of the frame of interest.

FIG. 5 is a view for explaining a process of substituting an MR image of an immediately preceding frame for that of the frame of interest. Referring to FIG. 5, reference numeral 502 denotes an MR image of the frame of interest, which includes an error portion. If the size of the error portion is equal to or larger than the threshold and no error portion exists within an MR image 503 of a frame immediately before the frame of interest, the MR image 503 is displayed in place of the MR image 502.

Such method is effective when there is no major change between the image contents of the frames, that is, when the amount of motion of the image sensing unit 103 is small. In this case, a shift between an MR image presented to the right eye of the observer and that presented to the left eye is small and a sense of stereoscopic viewing does not deteriorate. It is therefore possible to provide a natural MR image for the observer.

Figure 6:
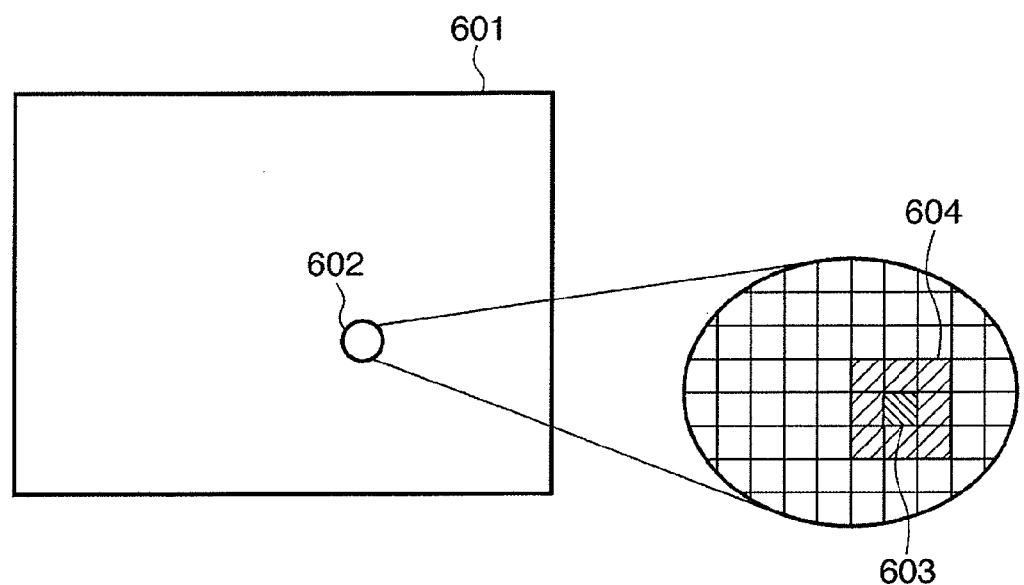
FIG. 6 is a view for explaining a process of correcting an error portion by using a pixel group surrounding it.

FIG. 6 is a view for explaining a process of correcting an error portion by using a pixel group surrounding it.

Referring to FIG. 6, assume that an error portion exists within a region 602. Reference numeral 603 denotes a pixel as the error portion. Eight pixels 604 in the vicinity of the pixel 603 are used to correct the pixel 603. In this correction process, an average value of the pixel values of the eight pixels 604 is calculated and the average value is set as the pixel value of the pixel 603. In order to reduce the process load, an average value of the pixel values of two pixels adjacent to each other in the vertical or horizontal direction may be set as the pixel value of the pixel 603.

Although FIG. 6 shows a case in which a pixel exists as the error portion, the same process is executed when a plurality of neighboring pixels form the error portion. That is, an average value of the pixel values of pixels in the vicinity of the error portion is calculated. The average value is weighted in accordance with the shortest distance between "a pixel forming the error portion" and "a pixel forming non-error portion in the vicinity of the error portion" and the weighted average value is set as the pixel value of "the pixel forming the error portion".

As described above, there are various methods for correcting the pixel value of the pixel forming the error portion, and the present invention is not limited to any of them.

[Second Embodiment]

In this embodiment, as an error portion correction method, a method of correcting an error portion by substituting an MR image generated for the other eye for an MR image of the frame of interest or a method of correcting the error portion by using a pixel group surrounding it is used.

Figure 7:
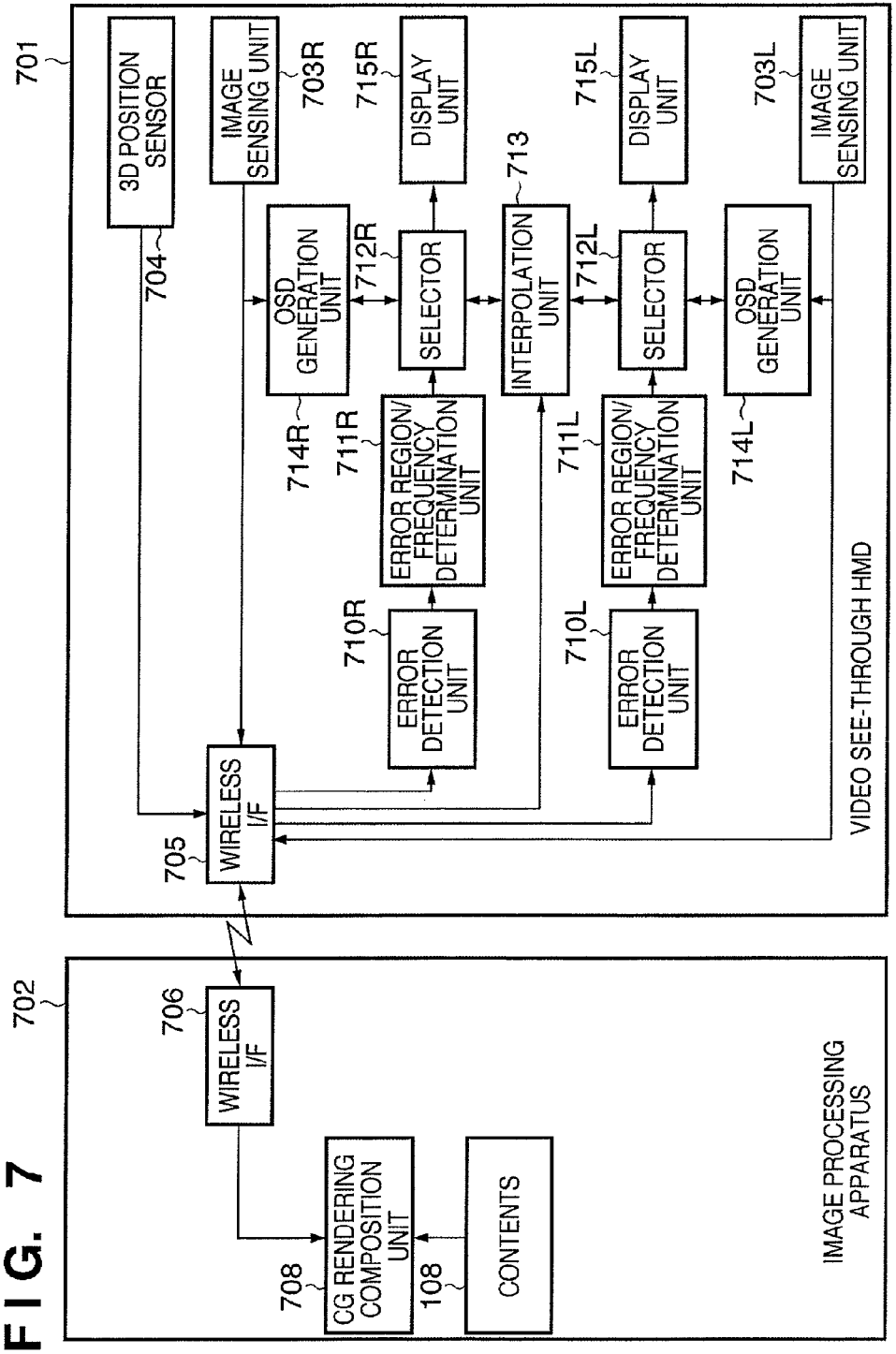
FIG. 7 is a block diagram showing a functional arrangement example of a system according to the second embodiment of the present invention.

FIG. 7 is a block diagram showing a functional arrangement example of a system according to this embodiment. As shown in FIG. 7, the system according to this embodiment comprises an image processing apparatus 702 and a video see-through HMD 701. The basic operation of the image processing apparatus 702 is the same as that of an image processing apparatus 102 shown in FIG. 1, and the different points from the first embodiment will be described below.

The video see-through HMD 701 will be described first. As shown in FIG. 7, the video see-through HMD 701 includes a presentation unit for presenting an image to the right eye of an observer wearing the video see-through HMD 701 on the head, and a presentation unit for presenting an image to the left eye. Note that in the arrangement of the video see-through HMD 701 shown in FIG. 7, R is appended to a reference number of each component for presenting the image to the right eye of the observer and L is appended to a reference number of each component for presenting the image to the left eye. Assume that the components denoted by the same reference numbers without R or L perform the same operation. Although the components for presenting an image to one eye will be described below, the same explanation can be applies to the components for presenting an image to the other eye.

A 3D position sensor 704 measures the position and orientation of itself. There are various kinds of sensors applicable to the 3D position sensor 704, and the sensor is not limited to any of them. The position and orientation information measured by the 3D position sensor 704 is output to a wireless I/F 705.

An image sensing unit 703R executes the same sensing operation as that of the above-described image sensing unit 103. That is, the image sensing unit 703R senses physical space images of frames, and sequentially outputs them to the subsequent wireless I/F 705.

The wireless I/F 705 wirelessly transmits, to the image processing apparatus 702, the position and orientation information received from the 3D position sensor 704 and the physical space image received from the image sensing unit 703R (an image sensing unit 703L).

On the image processing apparatus 702 side, a wireless I/F 706 outputs, to a subsequent CG rendering composition unit 708, the physical space image and the position and orientation information which have been transmitted from the video see-through HMD 701.

The CG rendering composition unit 708 calculates the position and orientation of the image sensing unit 703R by adding the position and orientation relationship between the 3D position sensor 704 and the image sensing unit 703R, which has been measured in advance, to the position and orientation represented by the position and orientation information received from the wireless I/F 706. The CG rendering composition unit 708 generates an image of a virtual space based on data of contents 108, which is seen from the viewpoint having the calculated position and orientation. The CG rendering composition unit 708 superimposes the generated image on the physical space image sensed by the image sensing unit 703R and generates a right-eye MR image. A left-eye MR image is generated in the same manner. The right- and left-eye MR images are output to the wireless I/F 706. The wireless I/F 706 separately transmits these two MR images or transmits them as a stream to the video see-through HMD 701.

Upon reception of the right- and left-eye MR images transmitted from the image processing apparatus 702, the wireless I/F 705 outputs them to error detection units 710R and 710L, respectively. The right- and left-eye MR images are also output to an interpolation unit 713.

The error detection unit 710R executes the same process as in the above-described error detection unit 109, and detects an error portion within the MR image.

An error region/frequency determination unit 711R refers to a determination result by the error detection unit 710R. If the error detection unit 710R detects no error portion, the error region/frequency determination unit 711R informs a selector 712R of it. If the error detection unit 710R detects an error portion, by using "the size of the error portion" acquired during the determination process and "a result determined by the error detection unit 710R for an image of a past frame", the error region/frequency determination unit 711R executes a determination process to be described later. This determination process is executed as follows. That is, it is determined whether the error portion within the right-eye MR image of the current frame is to be corrected by substituting the left-eye MR image of the current frame for the right-eye MR image of the same frame or by using a pixel group surrounding the error portion, or whether it is impossible to correct the error portion. The error region/frequency determination unit 711R informs the subsequent selector 712R of the determination result.

If the error region/frequency determination unit 711R informs the selector 712R that the error detection unit 710R detects no error portion, the selector 712R acquires "the right-eye MR image of the current frame" received by the interpolation unit 713 from the wireless I/F 705, and outputs the acquired image to a display unit 715R.

If the error region/frequency determination unit 711R informs the selector 712R that the left-eye MR image of the current frame is to be substituted for the right-eye MR image of the same frame in order to correct the error portion, the selector 712R operates as follows. That is, the selector 712R acquires "the left-eye MR image of the current frame" from the interpolation unit 713, and outputs the acquired image to the display unit 715R.

If the error region/frequency determination unit 711R informs the selector 712R that the error portion is to be corrected by using the pixel group surrounding it, the selector 712R operates as follows. That is, the selector 712R acquires "the right-eye MR image of the current frame" which has been received by the interpolation unit 713 from the wireless I/F 705, and corrects the error portion in the same way as in the first embodiment. The selector 712R outputs the corrected MR image to the display unit 715R.

If the error region/frequency determination unit 711R informs the selector 712R that it is impossible to correct the error portion, the selector 712R operates as follows. The selector 712R instructs an OSD generation unit 714R to superimpose message information representing a warning on the physical space image acquired by the OSD generation unit 714R from the image sensing unit 703R as the physical space image of the current frame. The selector 712R outputs to the display unit 715R the physical space image on which the message information is superimposed.

Upon reception of the image from the selector 712R, the display unit 715R displays the received image. The display unit 715R is attached to the video see-through HMD 701 so as to be located in front of the eyes (the right eye) of the observer wearing the video see-through HMD 701 on the head. The image output from the selector 712R is therefore displayed in front of the eyes (the right eye) of the observer wearing the video see-through HMD 701 on the head.

Figure 8:
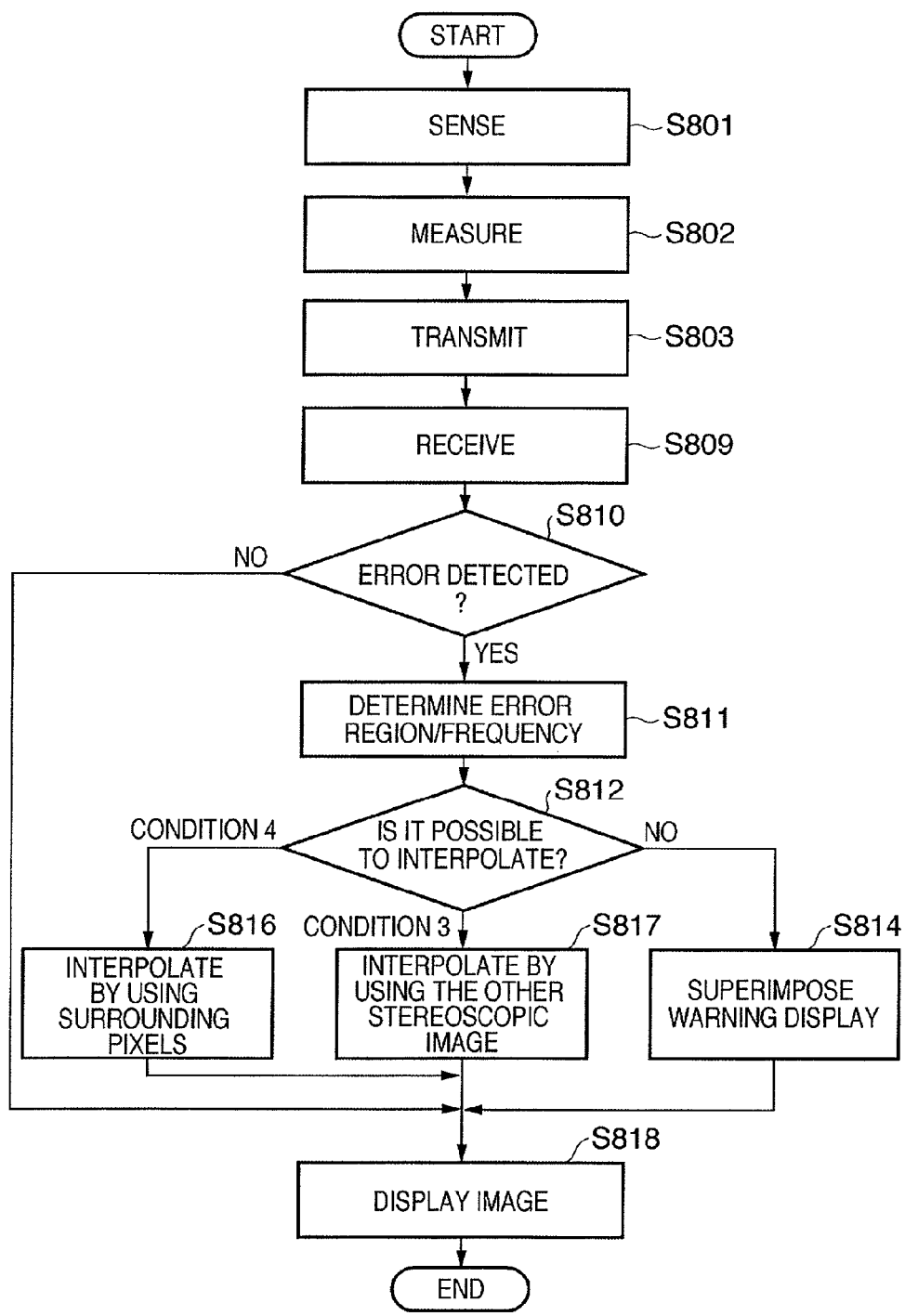
FIG. 8 is a flowchart of a process executed by a video see-through HMD 701.

FIG. 8 is a flowchart of a process executed by the video see-through HMD 701. Note that the process according to the flowchart shown in FIG. 8 is that of causing the display unit 715R to display an MR image of a frame, and in practice the process is repeated. This enables the display unit 715R to display MR images of a plurality of frames. To cause the display unit 715L to display an MR image of a frame, the same process is executed. Note that a process of causing the display unit 715R to display a right-eye MR image of the frame of interest (each of the second and subsequent frames) will be described below for descriptive convenience.

In step S801, the image sensing unit 703R senses a physical space seen from the position of the image sensing unit 703R itself in a sensing direction to acquire an image of the frame of interest. The image sensing unit 703R then outputs the sensed image to the wireless I/F 705 and OSD generation unit 714R.

In step S802, the 3D position sensor 704 measures the position and orientation of itself, and outputs the measurement result as position and orientation information to the wireless I/F 705.

In step S803, the wireless I/F 705 wirelessly transmits, to the image processing apparatus 702, the image of the frame of interest acquired in step S801 and the position and orientation information acquired in step S802.

The image processing apparatus 702 generates a right-eye MR image of the frame of interest by executing the above-described process, and wirelessly transmits the right-eye MR image to the video see-through HMD 701 via the wireless I/F 706.

In step S809, the wireless I/F 705 receives the right-eye MR image of the frame of interest transmitted from the image processing apparatus 702. The wireless I/F 705 outputs the received MR image to the error detection unit 710R and interpolation unit 713.

In step S810, the error detection unit 710R determines whether an error portion exists within the right-eye MR image of the frame of interest. The error detection unit 710R then informs the error region/frequency determination unit 711R of the determination result. If the determination result represents that the error portion exists, the process advances to step S811; otherwise, the process advances to step S818.

If the process advances from step S810 to step S818, the error region/frequency determination unit 711R informs the selector 712R in step S818 that the error detection unit 710R detects no error portion. The selector 712R acquires "the right-eye MR image of the frame of interest" which has been received by the interpolation unit 713 from the wireless I/F 705, and outputs the acquired image to the display unit 715R.

On the other hand, in step S811, the error region/frequency determination unit 711R determines whether the error portion detected in step S810 is corrected (it is possible to correct the error portion).

Details of this determination process will be described here. The error region/frequency determination unit 711R refers to "the size of the error portion" acquired during the process of detecting the error portion by the error detection unit 710R and "a result determined by the error detection unit 710R for an image of a past frame". The error region/frequency determination unit 711R determines whether "the size of the error portion" is equal to or larger than a predetermined threshold. The error region/frequency determination unit 711R also determines whether the error detection unit 710R determines that "an error portion exists" in the MR image of the frame (the immediately preceding frame in this embodiment) before the frame of interest. Assume that the determination result for the past frame by the error detection unit 710R is held by the error detection unit 710R itself.

If the determination result represents that "the size of the error portion" is equal to or larger than the predetermined threshold and the error detection unit 710R determines that "the error portion exists" in the MR image of the frame immediately before the frame of interest, the error region/frequency determination unit 711R determines that "it is impossible to correct the error portion".

If it is determined that "the size of the error portion" is equal to or larger than the predetermined threshold (condition 3), the error region/frequency determination unit 711R determines that the left-eye MR image of the frame of interest is to be substituted for the right-eye MR image of the frame of interest.

If it is determined that "the size of the error portion" is smaller than the predetermined threshold (condition 4), the error region/frequency determination unit 711R determines that the error portion is to be corrected by using the pixel group surrounding it.

As described above, when an error portion exists within an MR image of the frame of interest, it can be determined whether it is possible to correct the error portion. If it is possible to correct the error portion, how to correct it can be determined.

The above-described determination result by the error region/frequency determination unit 711R is output to the subsequent selector 712R.

If the error region/frequency determination unit 711R informs the selector 712R that "it is impossible to correct the error portion", the process advances to step S814 via step S812.

In step S814, the selector 712R instructs the OSD generation unit 714R to superimpose message information representing a warning on the physical space image which has been acquired by the OSD generation unit 714R from the image sensing unit 703R as the physical space image of the frame of interest. The selector 712R outputs to the display unit 715R the physical space image on which the message information is superimposed. In step S818, the display unit 715R displays the physical space image on which the message information is superimposed.

If the above (condition 3) is satisfied, the process advances to step S817 via step S812.

In step 817, the selector 712R acquires "the left-eye MR image of the frame of interest" from the interpolation unit 713, and outputs the acquired image to the display unit 715R. In step S818, the display unit 715R displays the left-eye MR image of the frame of interest as the right-eye MR image of the frame of interest.

If the above (condition 4) is satisfied, the process advances to step S816 via step S812.

In step S816, the selector 712R acquires "the right-eye MR image of the current frame" which has been received by the interpolation unit 713 from the wireless I/F 705, and corrects the error portion in the same way as in the first embodiment. The selector 712R then outputs the corrected MR image to the display unit 715R. In step S818, the display unit 715R displays, as the right-eye MR image of the frame of interest, the MR image within which the error portion has been corrected using the pixel group surrounding it.

Figure 9:
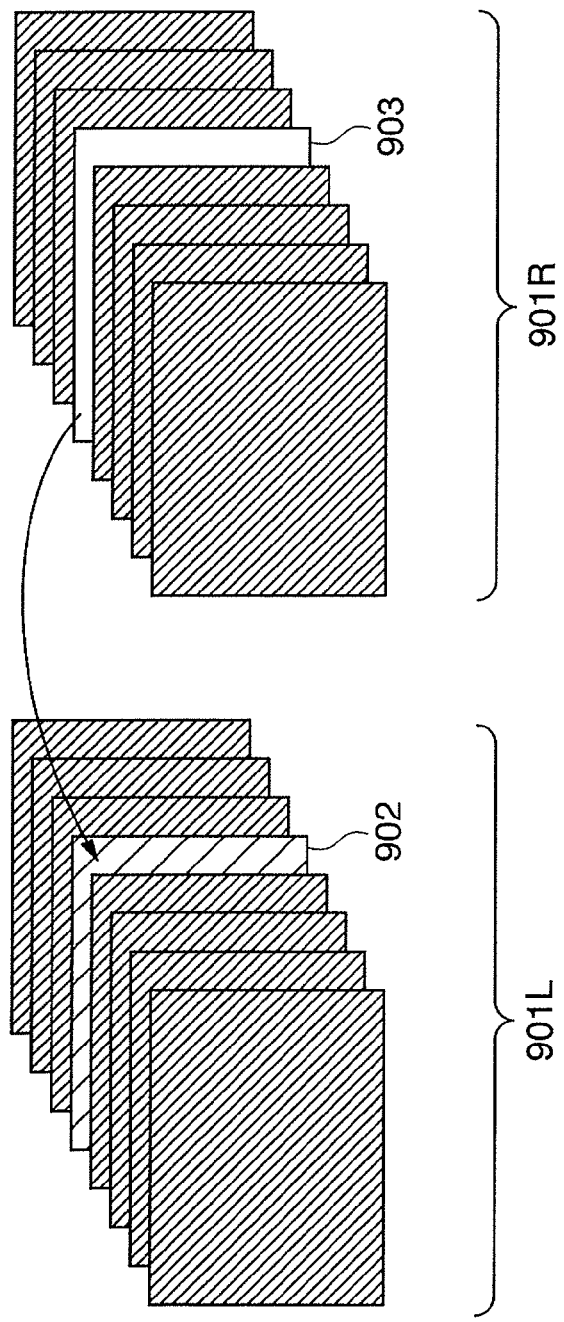
FIG. 9 is a view for explaining a process of substituting an MR image for one eye for an MR image for the other eye in order to correct an error portion within the MR image for the other eye.

FIG. 9 is a view for explaining a process of substituting an MR image for one eye for an MR image for the other eye in order to correct an error portion within the MR image for the other eye. Referring to FIG. 9, reference numeral 901L denotes left-eye MR images of frames; and 901R, right-eye MR images of frames. Assume that an error portion is detected within a left-eye MR image 902 and that the size of the error portion is equal to or larger than a predetermined threshold. In this case, of the right-eye MR images 901R of the frames, a corresponding MR image 903 of a frame is displayed in place of the left-eye MR image 902. Since the identical MR images are displayed for the right and left eyes, a sense of depth by stereoscopic images is not obtained. It is, however, unnecessary to buffer MR images of past frames unlike in the first embodiment. Thus, the circuit arrangement is simple and low in price.

[Third Embodiment]

Figure 10:
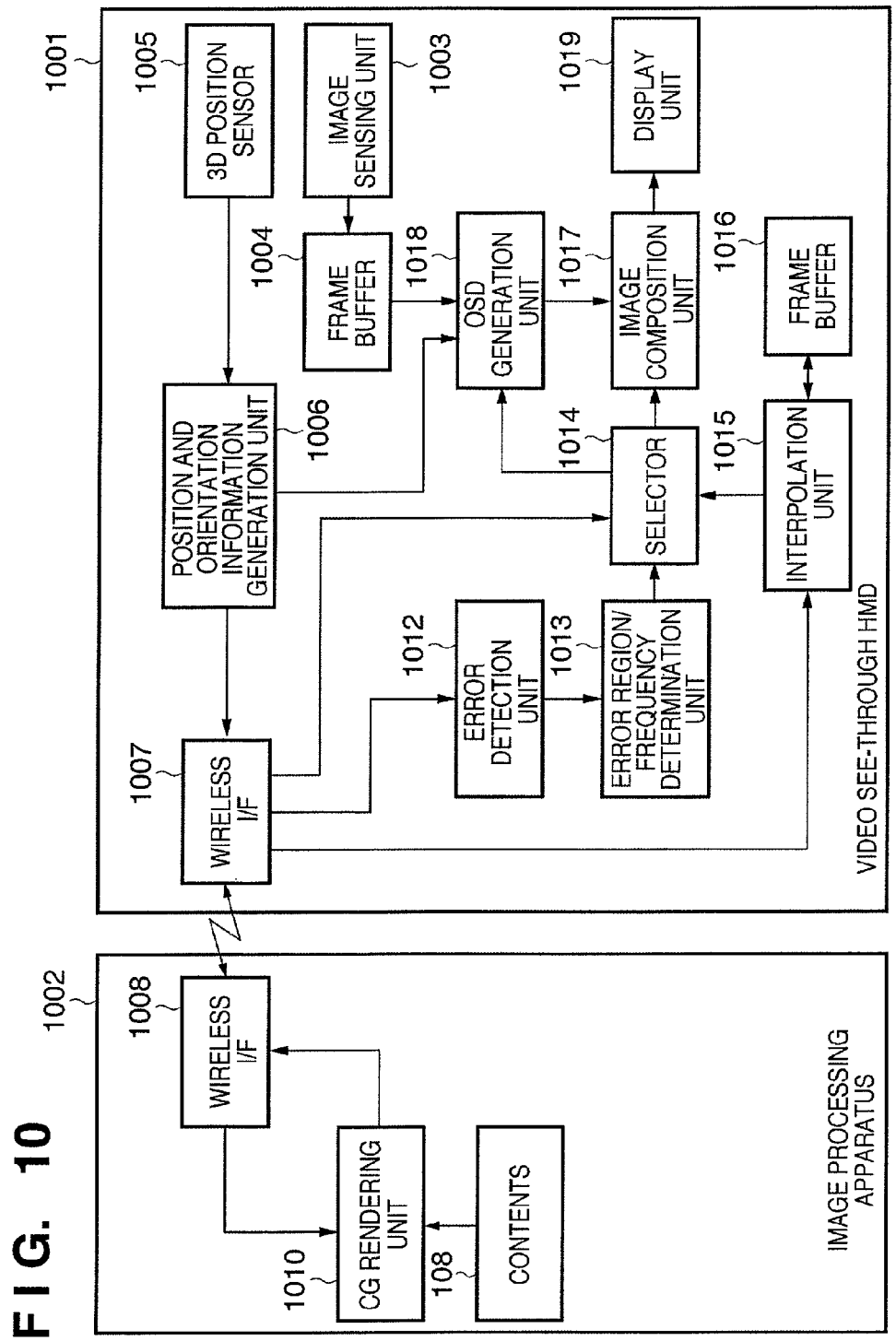
FIG. 10 is a block diagram showing a functional arrangement example of a system according to the third embodiment of the present invention.

FIG. 10 is a block diagram showing a functional arrangement example of a system according to this embodiment. As shown in FIG. 10, the system according to this embodiment comprises an image processing apparatus 1002 and a video see-through HMD 1001, which wirelessly communicate with each other. The system is the same as that in the first or second embodiment in this point.

The video see-through HMD 1001 will be described first.

A 3D position sensor 1005 is similar to the 3D position sensor 704 shown in FIG. 7. The 3D position sensor 1005 measures the position and orientation of itself, and outputs the measurement result as position and orientation information to a subsequent position and orientation information generation unit 1006.

The position and orientation information generation unit 1006 calculates the position and orientation of an image sensing unit 1003 by adding the position and orientation relationship between the 3D position sensor 1005 and the image sensing unit 1003, which has been measured in advance, to the position and orientation represented by the position and orientation information. The position and orientation information generation unit 1006 then outputs position and orientation information representing the calculated position and orientation to a wireless I/F 1007.

The image sensing unit 1003 is similar to the image sensing unit 103 shown in FIG. 1, and senses physical space images of frames. The image sensing unit 1003 sequentially outputs the sensed physical space images of the frames to a frame buffer 1004.

The wireless I/F 1007 wirelessly transmits, to the image processing apparatus 1002, the position and orientation information received from the position and orientation information generation unit 1006.

On the image processing apparatus 1002 side, upon reception of the position and orientation information transmitted from the wireless I/F 1007, a wireless I/F 1008 outputs the information to a subsequent CG rendering unit 1010.

The CG rendering unit 1010 generates an image (virtual space image) of a virtual space based on data of contents 108, which is seen from the viewpoint having the position and orientation represented by the position and orientation information received from the wireless I/F 1008, and outputs the generated virtual space image to the wireless I/F 1008. The wireless I/F 1008 transmits the virtual space image to the video see-through HMD 1001.

The wireless I/F 1007 outputs, to an error detection unit 1012 and an interpolation unit 1015, the virtual space image transmitted from the image processing apparatus 1002.

Each time the virtual space image is received from the wireless I/F 1007, the interpolation unit 1015 stores the received virtual space image in a frame buffer 1016.

An error detection unit 1012 is similar to the error detection unit 109 shown in FIG. 1, and checks (determines) whether an error portion (error region) exists within the virtual space image received from the wireless I/F 1007. The error detection unit 1012 outputs the check result to a subsequent error region/frequency determination unit 1013.

The error region/frequency determination unit 1013 refers to the determination result by the error detection unit 1012. If the error detection unit 1012 detects no error portion, the error region/frequency determination unit 1013 informs a selector 1014 of it. On the other hand, if the error detection unit 1012 detects the error portion, by using "the size of the error portion" acquired during the determination process and "a result determined by the error detection unit 1012 for an image of a past frame", the error region/frequency determination unit 1013 executes a determination process. This determination process is executed as follows. That is, the error region/frequency determination unit 1013 determines whether the error portion within the virtual space image of the current frame is to be corrected by substituting a virtual space image of the immediately preceding frame for the virtual space image of the current frame or by using a pixel group surrounding the error portion, or whether it is impossible to correct the error portion. The error region/frequency determination unit 1013 informs the selector 1014 of the determination result.

If the error region/frequency determination unit 1013 informs the selector 1014 that the error detection unit 1012 detects no error portion, the selector 1014 instructs the interpolation unit 1015 to read out the virtual space image of the current frame stored in a frame buffer 1016. The interpolation unit 1015 reads out the virtual space image in accordance with the instruction, and outputs the readout image to the selector 1014. The selector 1014 outputs the virtual space image to a subsequent image composition unit 1017.

If the error region/frequency determination unit 1013 informs the selector 1014 that the virtual space image of the immediately preceding frame is to be substituted for that of the current frame in order to correct the error portion, the selector 1014 operates as follows. The selector 1014 instructs the interpolation unit 1015 to read out the virtual space image of the frame immediately before the current frame stored in the frame buffer 1016. The interpolation unit 1015 reads out the virtual space image in accordance with the instruction, and outputs the readout image to the selector 1014. The selector 1014 outputs the virtual space image to the subsequent image composition unit 1017.

If the error region/frequency determination unit 1013 informs the selector 1014 that the error portion is to be corrected by using the pixel group surrounding it, the selector 1014 operates as follows. The selector 1014 instructs the interpolation unit 1015 to read out the virtual space image of the current frame stored in the frame buffer 1016. The interpolation unit 1015 reads out the virtual space image in accordance with the instruction, and corrects the error portion within the readout virtual space image in the same way as the interpolation unit 112 of FIG. 1. The interpolation unit 1015 outputs the corrected virtual space image to the selector 1014. The selector 1014 outputs the virtual space image to the subsequent image composition unit 1017.

If the error region/frequency determination unit 1013 informs the selector 1014 that it is impossible to correct the error portion, the selector 1014 operates as follows. That is, the selector 1014 instructs and causes an OSD generation unit 1018 to superimpose message information representing a warning on the physical space image which has been acquired by the OSD generation unit 1018 from the frame buffer 1004 as the physical space image of the current frame. The selector 1014 outputs to the subsequent image composition unit 1017 the physical space image on which the message information is superimposed.

If the image composition unit 1017 receives from the selector 1014 the physical space image on which the message information is superimposed, it outputs the received image to a subsequent display unit 1019 without any change. On the other hand, if the image composition unit 1017 receives the virtual space image from the selector 1014, it composites the virtual space image on the physical space image held in the frame buffer 1004 as the physical space image of the same frame as that of the virtual space image, and generates an MR image. The image composition unit 1017 outputs the MR image to the display unit 1019.

At this stage, the OSD generation unit 1018 holds the position and orientation of the image processing apparatus 1002 and range information representing an amount of shift from the position and orientation, within which the 3D position sensor 1005 can measure. Upon reception of the position and orientation information from the 3D position sensor 1005, the position and orientation information generation unit 1006 informs the OSD generation unit 1018 of the information. The OSD generation unit 1018 determines whether the difference obtained by subtracting the position and orientation of the image processing apparatus 1002 from the position and orientation represented by the informed position and orientation information falls within the range represented by the range information. If the difference does not fall within the range, the OSD generation unit 1018 outputs, to the image composition unit 1017, message information to prompt the observer to move closer to the image processing apparatus 1002.

Upon reception of the message information, the image composition unit 1017 superimposes the message information on the target image to be output to the display unit 1019.

The display unit 1019 is similar to a display unit 115 shown in FIG. 1. Upon reception of the image from the image composition unit 1017, the display unit 1019 displays the received image.

Figure 11:
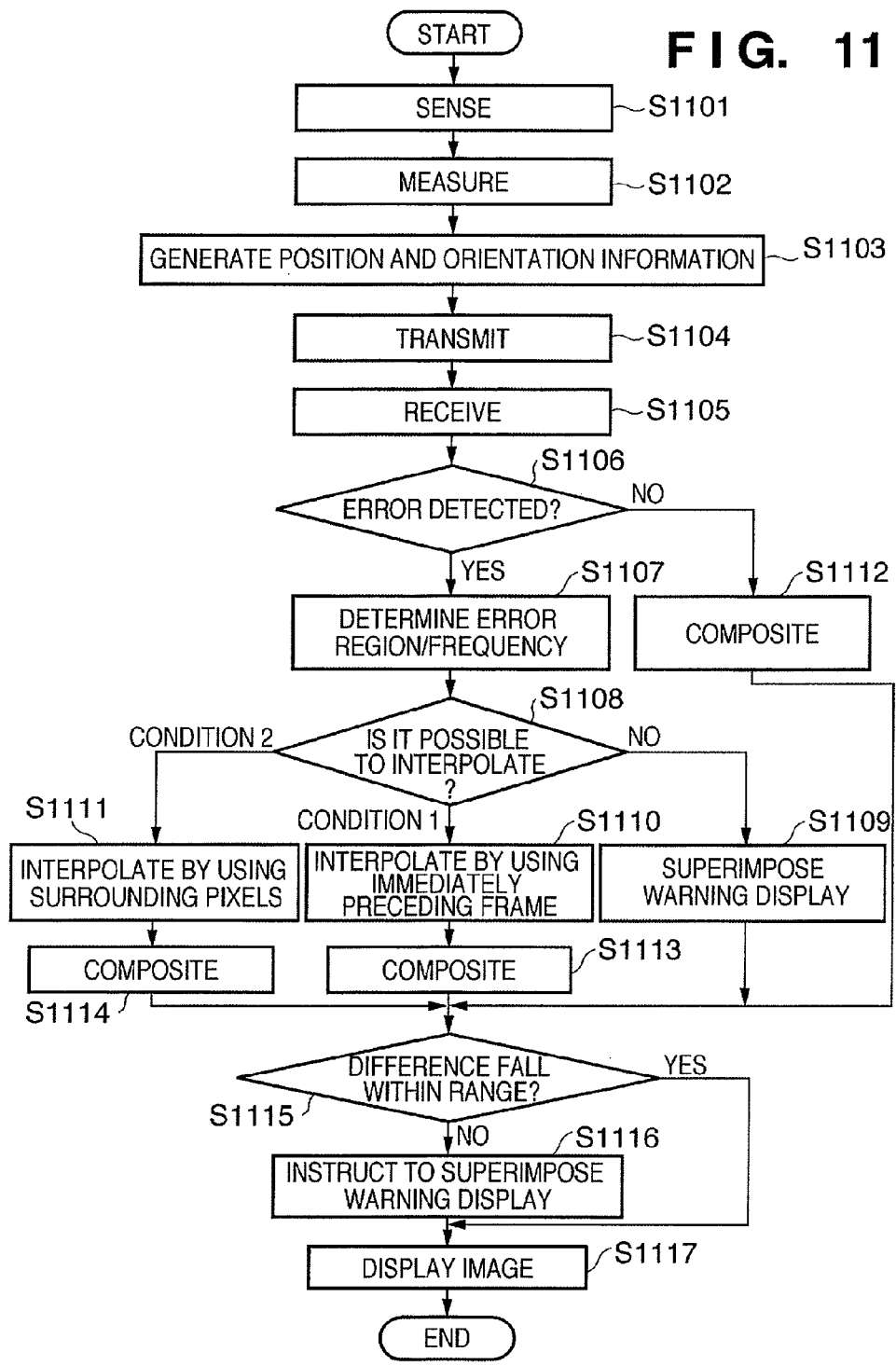
FIG. 11 is a flowchart of a process executed by a video see-through HMD 1001.
Figure 12:
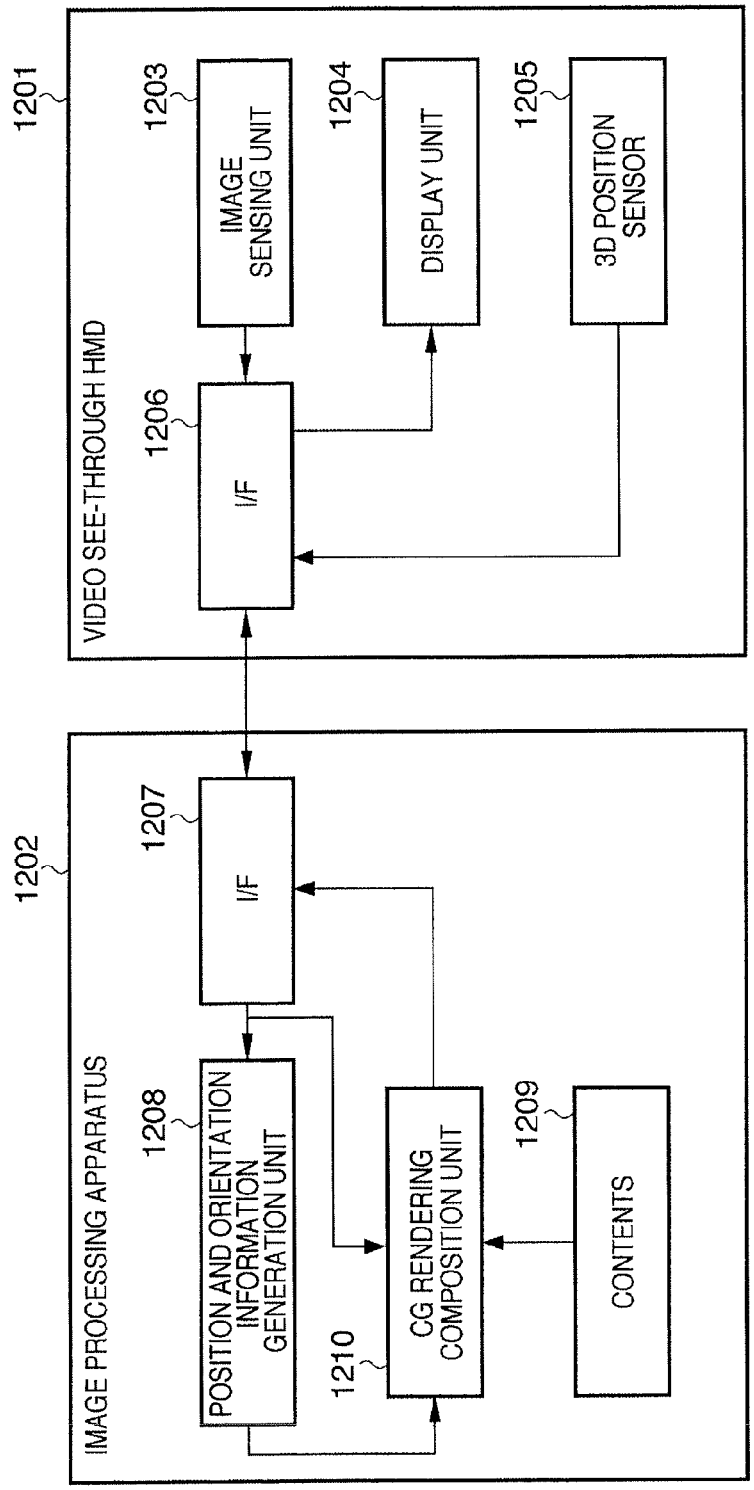
FIG. 12 is a block diagram showing the functional arrangement of a general video see-through mixed reality system.

FIG. 11 is a flowchart of a process executed by the video see-through HMD 1001. The process according to the flowchart shown in FIG. 11 is that of causing the display unit 1019 to display an MR image of a frame, and in practice the process is repeated. This enables the display unit 1019 to display MR images of a plurality of frames. Note that a process of causing the display unit 1019 to display an MR image of the frame of interest (each of the second and subsequent frames) will be described below for descriptive convenience.

In step S1101, the image sensing unit 1003 acquires an image of the frame of interest by sensing a physical space seen from the position of the image sensing unit 1003 in a sensing direction. The image sensing unit 1003 outputs the acquired image to the frame buffer 1004.

In step S1102, the 3D position sensor 1005 measures the position and orientation of itself, and outputs position and orientation information as the measurement result to the position and orientation information generation unit 1006.

In step S1103, the position and orientation information generation unit 1006 generates position and orientation information representing the position and orientation of the image sensing unit 1003 as described above.

In step S1104, the wireless I/F 1007 wirelessly transmits the position and orientation information calculated in step S1103 to the image processing apparatus 1002.

The image processing apparatus 1002 generates a virtual space image of the frame of interest using the position and orientation information transmitted in step S1104, and wirelessly transmits the generated image to the video see-through HMD 1001 via the wireless I/F 1008.

In step S1105, the wireless I/F 1007 receives the virtual space image of the frame of interest transmitted from the image processing apparatus 1002. The wireless I/F 1007 outputs the received virtual space image to the error detection unit 1012 and interpolation unit 1015. The interpolation unit 1015 stores the virtual space image of the frame of interest in the frame buffer 1016.

In step S1106, the error detection unit 1012 determines whether an error portion exists within the virtual space image of the frame of interest. The error detection unit 1012 informs the error region/frequency determination unit 1013 of the determination result. If the determination result represents that an error portion exits, the process advances to step S1107; otherwise, the process advances to step S1112.

In step S1112, the error region/frequency determination unit 1013 informs the selector 1014 that the error detection unit 1012 detects no error portion. The selector 1014 instructs the interpolation unit 1015 to read out the virtual space image of the frame of interest stored in the frame buffer 1016. The interpolation unit 1015 reads out the virtual space image of the frame of interest in accordance with the instruction, and outputs the readout image to the selector 1014. The selector 1014 outputs the virtual space image to the image composition unit 1017. The image composition unit 1017 composites the virtual space image received from the selector 1014 on the physical space image held in the frame buffer 1004 as the physical space image of the same frame as that of the virtual space image, and generates an MR image.

In step S1115, the OSD generation unit 1018 determines whether the difference obtained by subtracting the position and orientation of the image processing apparatus 1002 from the position and orientation represented by the position and orientation information informed from the position and orientation information generation unit 1006 falls within the range represented by the range information. If the difference falls within the range, the process advances to step S1117; otherwise, the process advances to step S1116. In step S1116, the OSD generation unit 1018 outputs, to the image composition unit 1017, message information to prompt the observer to move closer to the image processing apparatus 1002.

In step S1117, the image composition unit 1017 outputs the MR image generated in step S1112 to the display unit 1019. If, however, the image composition unit 1017 receives "the message information to prompt the observer to move closer to the image processing apparatus 1002", the image composition unit 1017 outputs to the display unit 1019 an MR image on which the message information is superimposed.

In step S1107, the error region/frequency determination unit 1013 determines in the same way as in the first embodiment whether the error portion detected in step S1106 is to be corrected (it is possible to correct the error portion). The determination result by the error region/frequency determination unit 1013 is output to the subsequent selector 1014.

If the error region/frequency determination unit 1013 informs the selector 1014 that "it is impossible to correct the error portion", the process advances to step S1109 via step S1108.

In step S1109, the selector 1014 instructs the OSD generation unit 1018 to superimpose message information representing a warning on the physical space image which has been acquired by the OSD generation unit 1018 from the frame buffer 1004 as the physical space image of the frame of interest. The selector 1014 outputs to the image composition unit 1017 the physical space image on which the message information is superimposed.

If the above (condition 1) is satisfied, the process advances to step S1110 via step S1108.

In step S1110, the selector 1014 instructs the interpolation unit 1015 to read out the virtual space image of the frame immediately before the frame of interest stored in the frame buffer 1016. The interpolation unit 1015 reads out the virtual space image in accordance with the instruction, and outputs the readout image to the selector 1014. The selector 1014 outputs the virtual space image to the image composition unit 1017.

In step S1113, the image composition unit 1017 composites the virtual space image received from the selector 1014 on the physical space image held in the frame buffer 1004 as the physical space image of the same frame as that of the virtual space image, and generates an MR image.

If the above (condition 2) is satisfied, the process advances to step S1111 via step S1108.

In step S1111, the selector 1014 instructs the interpolation unit 1015 to read out the virtual space image of the frame of interest stored in the frame buffer 1016. The interpolation unit 1015 reads out the virtual space image in accordance with the instruction, and corrects the error portion within the virtual space image in the same way as in the first embodiment. The interpolation unit 1015 outputs the corrected virtual space image to the selector 1014. The selector 1014 outputs the corrected virtual space image to the image composition unit 1017.

In step S1114, the image composition unit 1017 composites the virtual space image received from the selector 1014 on the physical space image held in the frame buffer 1004 as the physical space image of the same frame as that of the virtual space image, and generates an MR image.

In steps S1115 and S1116, the above-described processes are executed.

In step S1117, the image composition unit 1017 outputs, to the display unit 1019, the MR image generated in step S1113 or S1114, or the physical space image generated in step S1109. If, however, the image composition unit 1017 receives "the message information to prompt the observer to move closer to the image processing apparatus 1002", the image composition unit 1017 superimposes the message information on the image, and outputs it to the display unit 1019.

[Fourth Embodiment]

In this embodiment, when an error is detected within a virtual space image (CG image), the virtual space image is not rendered. In an MR application, a CG image which is not successfully rendered is an obstacle on a physical space image. Therefore, when an error is detected within a CG image, the CG image is not rendered.

Figure 13:
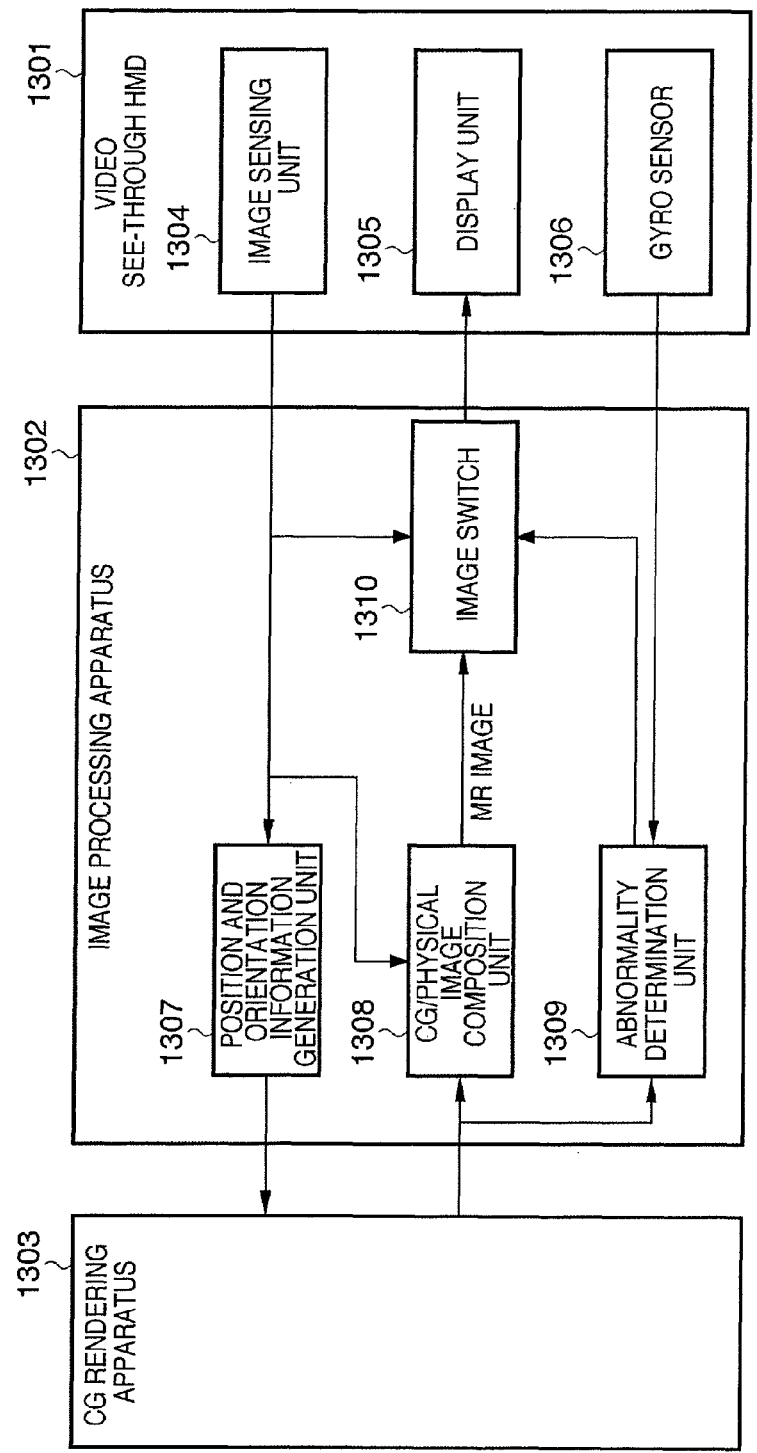
FIG. 13 is a block diagram showing a functional arrangement example of a system according to the fourth embodiment of the present invention.

FIG. 13 is a block diagram showing a functional arrangement example of a system according to this embodiment. As shown in FIG. 13, the system according to this embodiment comprises a CG rendering apparatus 1303, an image processing apparatus 1302, and a video see-through HMD 1301.

The video see-through HMD 1301 will be described first.

An image sensing unit 1304 is similar to the image sensing unit 103 described in the first embodiment, and senses a movie of a physical space. The sensed physical space image of each frame is output to the image processing apparatus 1302.

A display unit 1305 displays the image output from the image processing apparatus 1302.

As is well known, a gyro sensor 1306 measures the position and orientation of itself. Any sensor other than the gyro sensor 1306 may be used. Position and orientation information as the measurement result by the gyro sensor 1306 is output to the image processing apparatus 1302.

The image processing apparatus 1302 will be described next.

A position and orientation information generation unit 1307 is similar to the position and orientation information generation unit 106 shown in FIG. 1. The position and orientation information generation unit 1307 uses the physical space image output from the image sensing unit 1304 to generate position and orientation information representing the position and orientation of the image sensing unit 1304, and outputs the generated position and orientation information to the CG rendering apparatus 1303.

The CG rendering apparatus 1303 generates a virtual space image using the position and orientation information. The generation process has been described in the above embodiments, and a description thereof will be omitted. The CG rendering apparatus 1303 outputs the generated virtual space image to the image processing apparatus 1302.

Upon reception of the virtual space image output from the CG rendering apparatus 1303, a CG/physical image composition unit 1308 composites the virtual space image on the physical space image of the same frame as that of the virtual space image. That is, the image processing apparatus 1302 holds the physical space images, of several frames, output from the video see-through HMD 1301. Upon reception of the virtual space image from the CG rendering apparatus 1303, the CG/physical image composition unit 1308 acquires the physical space image of the same frame as that of the virtual space image from the held physical space images of the several frames. The CG/physical image composition unit 1308 then composites the acquired physical space image and the virtual space image received from the CG rendering apparatus 1303. A technique for specifying a corresponding frame is known, and a description thereof will be omitted.

The virtual space image transmitted from the CG rendering apparatus 1303 is also input to an abnormality determination unit 1309.

The abnormality determination unit 1309 determines whether an error exists within the virtual space image received from the CG rendering apparatus 1303. The determination is made in various manners.

If, for example, the virtual space images, of several frames, sequentially output from the CG rendering apparatus 1303 are held and there is no major change between the received virtual space images of the several frames, it is determined that an error exists. A technique for detecting a change between images is known. If, for example, an amount of motion of a specific object between images is smaller than a certain threshold, it is determined that there is no change between the images.

On the CG rendering apparatus 1303 side, identification information to identify an image of a frame, such as a time code, is embedded in a virtual space image. Upon reception of the virtual space image, the abnormality determination unit 1309 refers to the identification information. If the pieces of referred identification information are not continuous, it is determined that an error exists.

An amount of change between frames as a result of adding the position and orientation relationship between the image sensing unit 1304 and gyro sensor 1306, which has been measured in advance, to a value measured by the gyro sensor 1306, and an amount of change between the frames of the virtual space images received from the CG rendering apparatus 1303 are obtained. A difference Δ between the amounts of change is then calculated. If the calculated difference is equal to or larger than a predetermined threshold, it can be determined that the motion of the video see-through HMD 1301 does not coincide with that of the virtual space image generated on the CG rendering apparatus 1303 side. In this case, it is determined that an error exists.

A method of detecting whether an error exists is not limited to this, as a matter of course.

An image switch 1310 receives the determination result by the abnormality determination unit 1309. If an error exists, the image switch 1310 outputs the virtual space image received from the image sensing unit 1304 to the display unit 1305; otherwise, the image switch 1310 outputs the MR image generated by the CG/physical image composition unit 1308 to the display unit 1305. In this way, the image switch 1310 controls the display based on the determination result by the abnormality determination unit 1309. The display image may be gradually faded in/out instead of being suddenly switched.

The image switch 1310 may be omitted, and the composition ratio of a physical space image to a virtual space image may be controlled in accordance with the determination result by the abnormality determination unit 1309. For example, as the absolute value of the difference Δ is larger, composition with a higher ratio of the physical space image to the virtual space image is performed. As the absolute value of the difference Δ is smaller, the composition ratio of the physical space image to the virtual space image is set closer to 1:1.

Referring to FIG. 13, although the image processing apparatus 1302 and the CG rendering apparatus 1303 are separate apparatuses, they may be integrated in a single apparatus. This applies to any of the above embodiments. A designer decides which function is given to each apparatus, and also decides whether to use one or more apparatuses, as needed. In any case, the system is practically the same.

Figure 14:
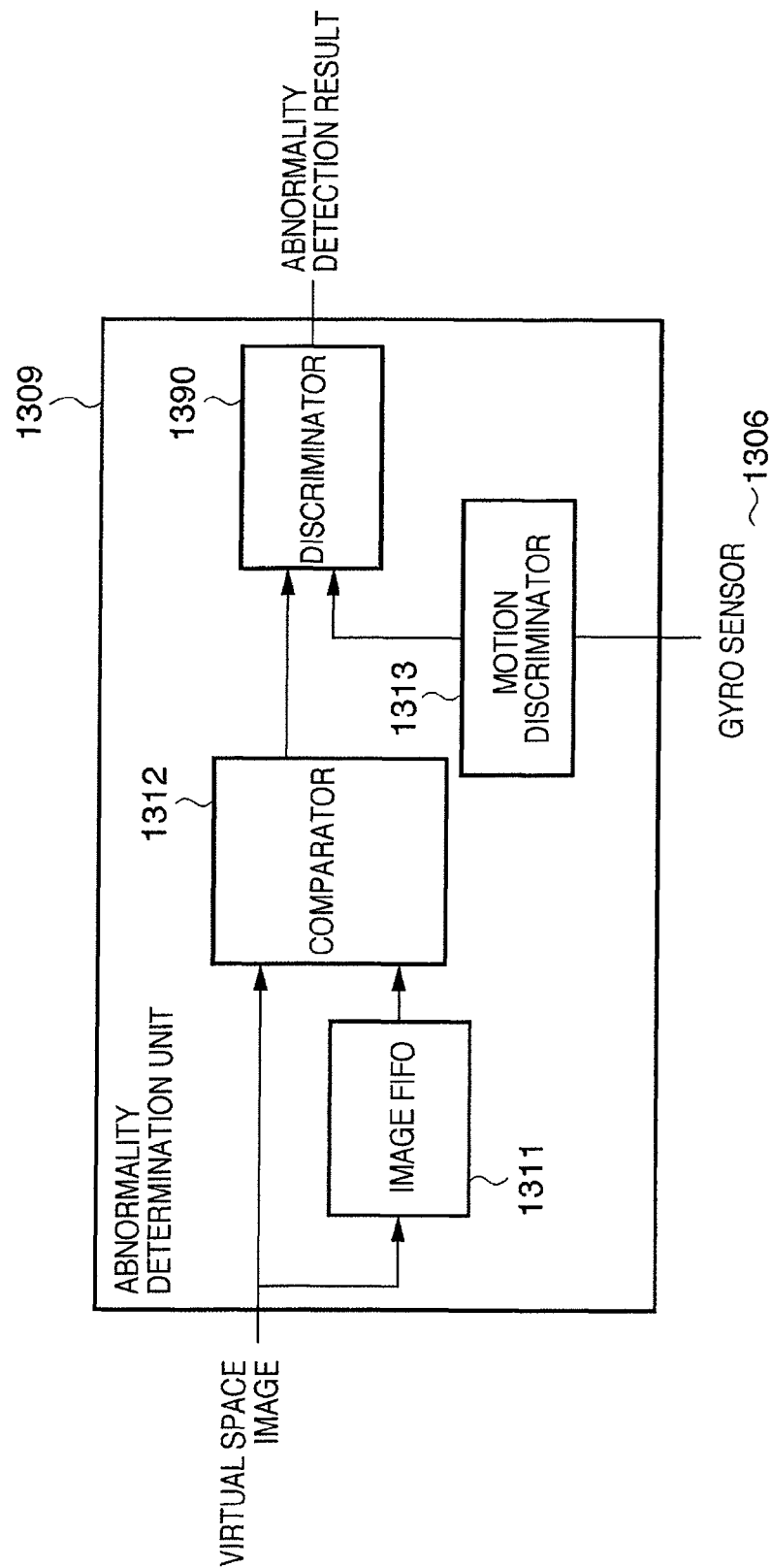
FIG. 14 is a block diagram showing a functional arrangement example of an abnormality determination unit 1309.

FIG. 14 is a block diagram showing a functional arrangement example of the abnormality determination unit 1309.

An image FIFO 1311 can hold virtual space images of several past frames.

A comparator 1312 calculates a motion vector between images by using a virtual space image input as the latest frame and a virtual space image of the immediately preceding frame held in the image FIFO 1311. The comparator 1312 outputs data of the calculated vector to a subsequent discriminator 1390.

A motion discriminator 1313 calculates a difference value between the pieces of position and orientation information sequentially output from the gyro sensor 1306, and outputs the difference value to the discriminator 1390.

The discriminator 1390 compares the vector from the comparator 1312 with the difference value from the motion discriminator 1313, and determines whether the difference between them is equal to or larger than the threshold. If the difference is equal to or larger than the threshold, the discriminator 1390 determines that an error exists, and outputs the determination result as an abnormality determination result.

[Fifth Embodiment]

In this embodiment, if an error is detected within a composite image of a virtual space image and a physical space image, the physical space image is displayed in place of the composite image.

Figure 15:
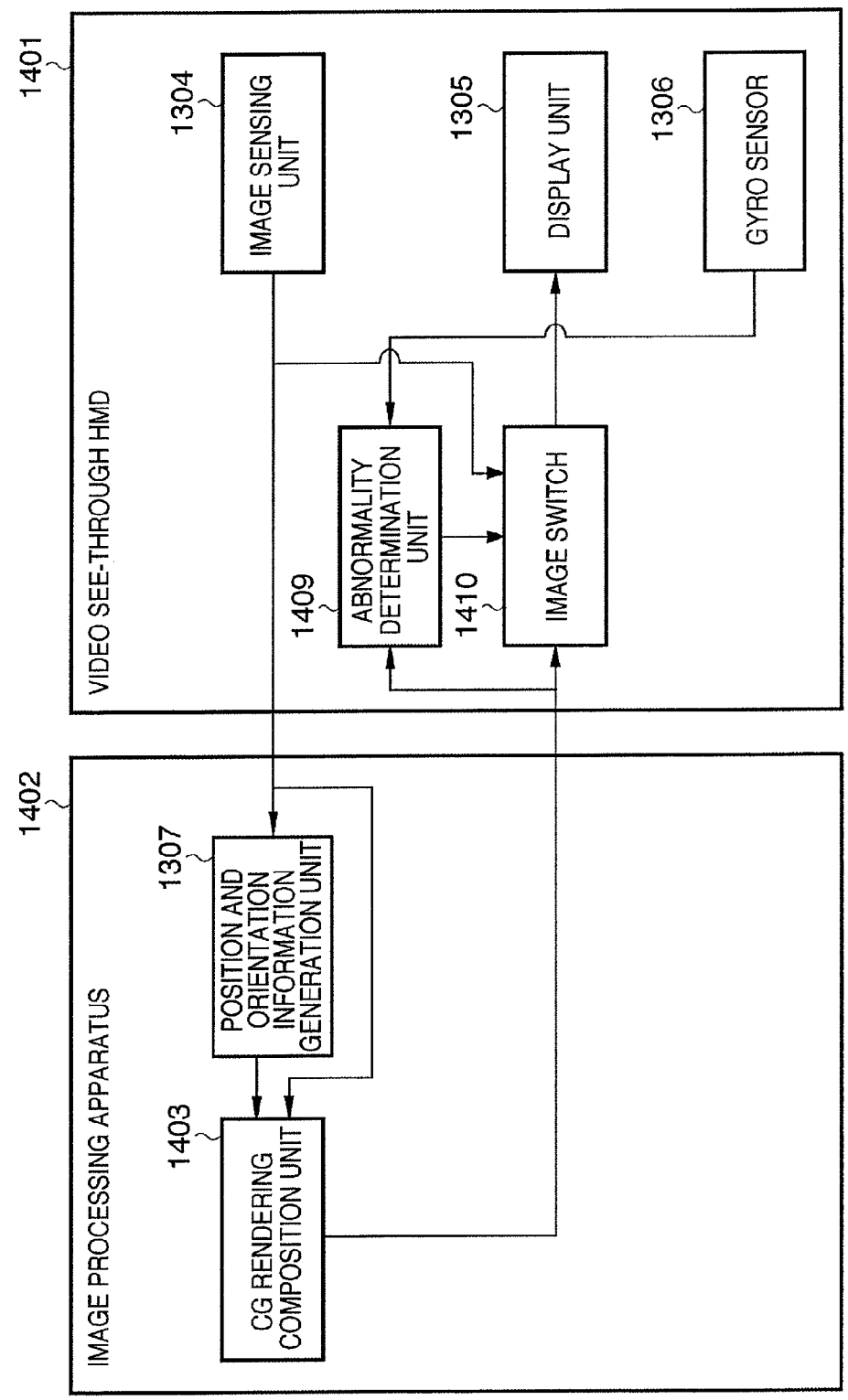
FIG. 15 is a block diagram showing a functional arrangement example of a system according to the fifth embodiment of the present invention.

FIG. 15 is a block diagram showing a functional arrangement example of a system according to this embodiment. As shown in FIG. 15, the system according to this embodiment comprises a video see-through HMD 1401 and an image processing apparatus 1402. Note that in FIG. 14, the same reference numerals as those in FIG. 13 denote the same components, and a description thereof will be omitted.

The video see-through HMD 1401 will be described first.

A physical space image sensed by an image sensing unit 1304 is output to the image processing apparatus 1402. A CG rendering composition unit 1403 generates a virtual space image seen from the viewpoint having the position and orientation represented by position and orientation information generated by a position and orientation information generation unit 1307. The CG rendering composition unit 1403 composites the generated virtual space image on the physical space image transmitted from the video see-through HMD 1401, and generates an MR image. The CG rendering composition unit 1403 then returns the generated MR image to the video see-through HMD 1401.

An abnormality determination unit 1409 determines whether an error exists within the MR image transmitted from the image processing apparatus 1402 in the same way as in the fourth embodiment.

The determination result is input to an image switch 1410. Along with the MR image transmitted from the image processing apparatus 1402, the physical space image from the image sensing unit 1304 is input to the image switch 1410. The image switch 1410 refers to the determination result by the abnormality determination unit 1409. If an error exists, the image switch 1410 outputs the physical space image to a display unit 1305; otherwise, the image switch 1410 outputs the MR image to the display unit 1305.

Figure 16:
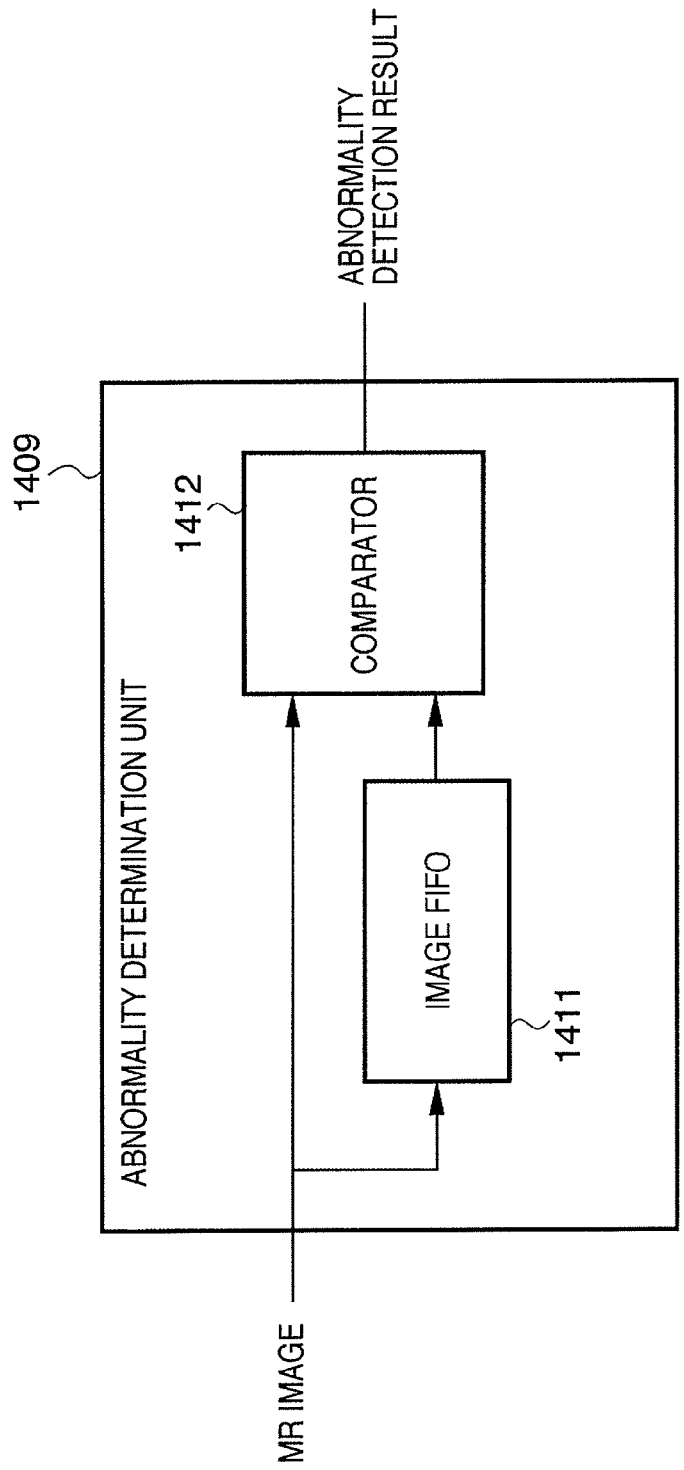
FIG. 16 is a block diagram showing a functional arrangement example of an abnormality determination unit 1409.

FIG. 16 is a block diagram showing a functional arrangement example of the abnormality determination unit 1409.

An image FIFO 1411 holds the MR images, of several frames, output from the image processing apparatus 1402. A comparator 1412 compares the MR image of the latest frame with that of the immediately preceding frame held in the image FIFO 1411, and calculates the amount of shift between the images. This process has been described in the fourth embodiment.

As a result of the comparison, if the shift amount is equal to or larger than a threshold, the comparator 1412 determines that an error exists, and outputs the determination result.

The above-described embodiments may be used in combination.

[Other Embodiment]

The object of the present invention is achieved by the following process. That is, a recording medium (storage medium) which records software program codes for implementing the functions of the above-described embodiments is supplied to a system or apparatus. The storage medium is a computer-readable storage medium. A computer (or a CPU or MPU) of the system or apparatus reads out and executes the program codes stored in the recording medium. In this case, the program codes read out from the recording medium implement the functions of the above-described embodiments, and the recording medium which records the program codes constitutes the present invention.

The present invention includes a case in which the functions of the above-described embodiments are implemented when the computer executes the readout program codes and an operating system (OS) or the like running on the computer performs some or all of actual processes based on the instructions of the program codes.

Furthermore, the present invention includes a case in which, after the program codes read out from the recording medium are written in the memory of a function expansion card inserted into the computer or the memory of a function expansion unit connected to the computer, the CPU of the function expansion card or function expansion unit performs some or all of actual processes based on the instructions of the program codes and thereby implements the functions of the above-described embodiments.

When the present invention is applied to the recording medium, the recording medium stores the program codes corresponding to the above-described flowcharts.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-142324 filed May 29, 2007, which is hereby incorporated by reference herein in its entirety.

What is claimed is:

1. An apparatus comprising one or more processors carrying out functions of a first obtaining unit, a second obtaining unit, a generation unit, a synthesizing unit, a determination unit, and a display control unit;

the first obtaining unit obtaining a physical space image obtained by sensing a physical space by an image sensing device;

the second obtaining unit obtaining a position and orientation of the image sensing device;

the generation unit generating a virtual object based on the position and orientation obtained by the second obtaining unit;

the synthesizing unit generating a synthesized image by synthesizing the physical space image with the virtual object;

the determination unit determining whether an error region exists in the synthesized image; and the display control unit causing a display device to display the synthesized image in a case where the determination unit does not determine that the error region exists in the synthesized image, and to cause the display device to display the physical space image in a case where the determination unit does determine that the error region exists in the synthesized image.

2. The apparatus according to claim 1, wherein the image sensing device is attached on a head mounted display.

3. The apparatus according to claim 1, wherein the display device is attached on a head mounted display.

4. The apparatus according to claim 1, further comprising:
a storage configured to store the synthesized image;
wherein the determination unit is further configured to determine whether an error region exists in a synthesized image of interest by comparing the synthesized image of interest and a synthesized image which was previously synthesized and stored in the storage.

5. The apparatus according to claim 4, wherein the determination unit is further configured to determine whether the error region exists in the synthesized image of interest by comparing the synthesized image of interest and a synthesized image which was synthesized immediately before the synthesized image of interest is synthesized.

6. A head mounted display which connects with an image processing apparatus, comprising:

an image capturing device which captures a physical space image;

a transmitter configured to transmit the physical space image to the image processing apparatus;

one or more processors carrying out functions of an obtaining unit, a determination unit, and a display control unit;

the obtaining unit obtaining a synthesized image generated by synthesizing the physical space image with a virtual object from the image processing apparatus via the transmitting unit; and the determination unit determining whether an error region exists in the synthesized image; and a display control unit causing a display device to display the synthesized image in a case where the determination unit does not determine that the error region exists in the synthesized image, and causing the display device to display the physical space image in a case where the determination unit does determine that the error region exists in the synthesized image.

7. A system comprising:
a display apparatus ;
an image processing apparatus which connects with the display apparatus and generates a virtual image to be displayed in the display apparatus;
wherein the display apparatus further comprises;
an image capturing device which captures a physical space image;

a first transmitter configured to transmit the physical space image to the image processing apparatus;

wherein the image processing apparatus further comprises;

a first receiver configured to receive the physical space image;

one or more first processors carrying out functions of an obtaining unit, a generation unit, a synthesizing unit;

the obtaining unit obtaining a position and orientation of the image display apparatus;

the generation unit generating a virtual object based on the position and orientation;

the synthesizing unit generating a synthesized image by synthesizing the physical space image with the virtual object; and a second transmitter configured to transmit the synthesized image to the display apparatus;

wherein the display apparatus further comprises;

a second receiver configured to receive the synthesized image from the image processing apparatus;

one or more second processors carrying out functions of a determination unit and a display control unit;

the determination unit determining whether an error region exists in the synthesized image; and the display control unit causing a display device to display the synthesized image in a case where the determination unit does not determine that the error region exists in the synthesized image, and causing the display device to display the physical space image in a case where the determination unit does determine that the error region exists in the synthesized image.

8. The apparatus according to claim 7, wherein the display apparatus is a head mounted display.

9. A method comprising:
obtaining a physical space image by sensing a physical space by an image sensing device;
obtaining a position and orientation of the image sensing device;
generating a virtual object based on the obtained position and orientation;
generating a synthesized image by synthesizing the physical space image with the virtual object;
determining whether an error region exists in the synthesized image; and
causing a display device to display the synthesized image in a case where it is not determined that the error region exists in the synthesized image, and causing the display device to display the physical space image in a case where it is determined that the error region exists in the synthesized image.

10. A non-transitory computer-readable medium storing a program for causing a computer to:
obtain a physical space image by sensing a physical space by an image sensing device;
obtain a position and orientation of the image sensing device;
generate a virtual object based on the obtained position and orientation;
generate a synthesized image by synthesizing the physical space image with the virtual object;
determine whether an error region exists in the synthesized image; and
cause a display device to display the synthesized image in a case where it is not determined that the error region exists in the synthesized image, and cause the display device to display the physical space image in a case where it is determined that the error region exists in the synthesized image.

11. A method comprising:
capturing a physical space image;
transmitting the physical space image to an image processing apparatus;
obtaining a synthesized image from the image processing apparatus, wherein the synthesized image is obtained by synthesizing the physical space image with a virtual object;
determining whether an error region exists in the synthesized image; and
causing a display device to display the synthesized image in a case where it is not determined that the error region exists in the synthesized image, and causing the display device to display the physical space image in a case where it is determined that the error region exists in the synthesized image.

12. A non-transitory computer-readable medium storing a program for causing a computer to:
capture a physical space image;
transmit the physical space image to an image processing apparatus;
obtain a synthesized image from the image processing apparatus, wherein the synthesized image is obtained by synthesizing the physical space image with a virtual object;
determine whether an error region exists in the synthesized image; and
cause a display device to display the synthesized image in a case where it is not determined that the error region exists in the synthesized image, and cause the display device to display the physical space image in a case where it is determined that the error region exists in the synthesized image.

13. A method comprising:
capturing a physical space image at a display apparatus;
transmitting the physical space image from the display apparatus to an image processing apparatus;
obtaining a position and orientation of the image display apparatus;
generating a virtual object based on the position and orientation;
generating a synthesized image by synthesizing the physical space image with the virtual object;
transmitting the synthesized image from the image processing apparatus to the display apparatus;
determining whether an error region exists in the synthesized image; and
causing a display device to display the synthesized image in a case where it is not determined that the error region exists in the synthesized image, and causing the display device to display the physical space image in a case where it is determined that the error region exists in the synthesized image.

14. A non-transitory computer-readable medium storing a program for causing a computer to:
capture a physical space image at a display apparatus;
transmit the physical space image from the display apparatus to an image processing apparatus;
obtain a position and orientation of the image display apparatus;
generate a virtual object based on the position and orientation;
generate a synthesized image by synthesizing the physical space image with the virtual object;

transmit the synthesized image from the image processing apparatus to the display apparatus;
determine whether an error region exists in the synthesized image; and
cause a display device to display the synthesized image in a case where it is not determined that the error region exists in the synthesized image, and cause the display device to display the physical space image in a case where it is determined that the error region exists in the synthesized image.

15. A head mounted display which connects with an image processing apparatus, comprising:
an image capturing device which captures a physical space image;
a transmitter configured to transmit the physical space image to the image processing apparatus;
one or more processors carrying out functions of an obtaining unit and a display control unit;
the obtaining unit obtaining a synthesized image generated by synthesizing the physical space image with a virtual object from the image processing apparatus via the transmitting unit; and
a display control unit causing a display device to display the synthesized image in a case where an error does not exist with the synthesized image, and causing the display device to display the physical space image in a case where an error exists with the synthesized image.

16. The head mounted display according to claim 15, wherein the one or more processors further carry out a function of a determination unit, the determination unit determining whether an error exists with the synthesized image.

17. The head mounted display according to claim 15, wherein the determination unit determines that the error exists with the synthesized image in a case where there is no change in a predetermined number of frames of the synthesized image obtained by the obtaining unit.

18. The head mounted display according to claim 16, wherein the determination unit determines that the error exists with the synthesized image in a case where a shift amount between the synthesized image obtained by the obtaining unit and an immediately preceding frame of the synthesized image is not less than a threshold.

19. A system comprising:
a display apparatus;
an image processing apparatus which connects with the display apparatus and generates a virtual image to be displayed in the display apparatus;
wherein the display apparatus further comprises;
an image capturing device which captures a physical space image;
a first transmitter configured to transmit the physical space image to the image processing apparatus;
wherein the image processing apparatus further comprises;
a first receiver configured to receive the physical space image;
one or more first processors carrying out functions of an obtaining unit, a generation unit, a synthesizing unit;
the obtaining unit obtaining a position and orientation of the image display apparatus;
the generation unit generating a virtual object based on the position and orientation;
the synthesizing unit generating a synthesized image by synthesizing the physical space image with the virtual object; and
a second transmitter configured to transmit the synthesized image to the display apparatus;
wherein the display apparatus further comprises;
a second receiver configured to receive the synthesized image from the image processing apparatus;
one or more second processors carrying out a function of a display control unit; and
the display control unit causing a display device to display the synthesized image in a case where an error does not exist with the synthesized image, and causing the display device to display the physical space image in a case where an error exists with the synthesized image.

20. A method comprising:
capturing a physical space image;
transmitting the physical space image to an image processing apparatus;
obtaining a synthesized image from the image processing apparatus, wherein the synthesized image is obtained by synthesizing the physical space image with a virtual object; and
causing a display device to display the synthesized image in a case where an error does not exist with the synthesized image, and causing the display device to display the physical space image in a case where an error exists with the synthesized image.

21. A non-transitory computer-readable medium storing a program for causing a computer to:
capture a physical space image;
transmit the physical space image to an image processing apparatus;
obtain a synthesized image from the image processing apparatus, wherein the synthesized image is obtained by synthesizing the physical space image with a virtual object; and
cause a display device to display the synthesized image in a case where an error does not exist with in the synthesized image, and cause the display device to display the physical space image in a case where an error exists with the synthesized image.

* * * * *